United States Patent
Harris et al.

(10) Patent No.: US 8,635,555 B2
(45) Date of Patent: Jan. 21, 2014

(54) JUMP, CHECKMARK, AND STRIKETHROUGH GESTURES

(75) Inventors: Jonathan R. Harris, Redmond, WA (US); Andrew S. Allen, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 83 days.

(21) Appl. No.: 12/796,476

(22) Filed: Jun. 8, 2010

(65) Prior Publication Data

US 2011/0302530 A1 Dec. 8, 2011

(51) Int. Cl.
*G06F 3/048* (2013.01)
*G06F 3/033* (2013.01)

(52) U.S. Cl.
USPC .......................................... 715/810; 715/863

(58) Field of Classification Search
USPC .................................. 715/810, 863
See application file for complete search history.

(56) References Cited

U.S. PATENT DOCUMENTS

| | | | |
|---|---|---|---|
| 5,745,116 A * | 4/1998 | Pisutha-Arnond | 715/863 |
| 6,525,749 B1 * | 2/2003 | Moran et al. | 715/863 |
| 7,093,202 B2 * | 8/2006 | Saund et al. | 715/863 |
| 7,782,307 B2 * | 8/2010 | Westerman et al. | 345/173 |
| 7,825,897 B2 * | 11/2010 | Keely et al. | 345/158 |
| 7,880,720 B2 * | 2/2011 | Hill et al. | 345/156 |
| 7,954,067 B2 * | 5/2011 | Breglio | 715/810 |
| 8,072,438 B2 * | 12/2011 | Pearce et al. | 345/173 |
| 2003/0179202 A1 * | 9/2003 | Saund et al. | 345/442 |
| 2006/0026536 A1 * | 2/2006 | Hotelling et al. | 715/863 |
| 2006/0034042 A1 * | 2/2006 | Hisano et al. | 361/681 |
| 2008/0036773 A1 * | 2/2008 | Bae | 345/442 |
| 2008/0168403 A1 | 7/2008 | Westerman et al. | |
| 2008/0250012 A1 | 10/2008 | Hinckley et al. | |
| 2008/0260252 A1 | 10/2008 | Borgaonkar et al. | |
| 2010/0031202 A1 | 2/2010 | Morris et al. | |
| 2010/0058252 A1 | 3/2010 | Ko | |
| 2010/0100854 A1 | 4/2010 | Russell et al. | |
| 2010/0245256 A1 * | 9/2010 | Estrada et al. | 345/173 |
| 2011/0063222 A1 * | 3/2011 | Chu et al. | 345/168 |

OTHER PUBLICATIONS

"International Search Report", Mailed Date: Jan. 18, 2012, Application No. PCT/US2011/038475, Filed Date: May 29, 2011, pp. 8.

* cited by examiner

*Primary Examiner* — David Phantana Angkool
(74) *Attorney, Agent, or Firm* — Wolfe-SBMC

(57) ABSTRACT

Techniques involving gestures and other functionality are described. In one or more implementations, the techniques describe gestures that are usable to provide inputs to a computing device. A variety of different gestures are contemplated, including an activate gesture, a fill gesture, a level gesture, a jump gesture, a checkmark gesture, a strikethrough gesture, an erase gesture, a circle gesture, a prioritize gesture, and an application tray gesture.

60 Claims, 24 Drawing Sheets

2100

2102
Recognize an input as an exclamation point drawn as a freeform line in association with an item displayed in a user interface of a display device of a computing device

2104
Identify a prioritize gesture by the computing device from the recognized input, the prioritize gesture effective to prioritize the item

2106
Prioritize the item to be positioned first on a list

2108
Flag the item

Fig. 21

JUMP, CHECKMARK, AND STRIKETHROUGH GESTURES

BACKGROUND

The amount of functionality that is available from computing devices is ever increasing, such as from mobile devices, game consoles, televisions, set-top boxes, personal computers, and so on. However, traditional techniques that were employed to interact with the computing devices may become less efficient as the amount of functionality increases.

For example, inclusion of additional functions in a menu may add additional levels to the menu as well as additional choices at each of the levels. Additionally, inclusion of these features using traditional techniques may force the user to navigate through menus to access the features "away" from the current user interface.

Consequently, the addition of these functions in the menu may frustrate users by the sheer number of choices of functions and thereby result in decreased utilization of both the additional functions as well as the device itself that employs the functions. Thus, traditional techniques that were used to access the functions may limit the usefulness of the functions and the device as a whole to a user of the computing device.

SUMMARY

Techniques involving gestures and other functionality are described. In one or more implementations, the techniques describe gestures that are usable to provide inputs to a computing device. A variety of different gestures are contemplated, including an activate gesture, a fill gesture, a level gesture, a jump gesture, a checkmark gesture, a strikethrough gesture, an erase gesture, a circle gesture, a prioritize gesture, and an application tray gesture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 21 is a flow diagram that depicts a procedure in an example implementation of a prioritize gesture of FIG. 1 in accordance with one or more embodiments.

DETAILED DESCRIPTION

Overview

Conventional techniques that were used to access functions of a computing device may become less efficient when expanded to access an ever increasing number of functions. Therefore, these conventional techniques may result in user frustration regarding the additional functions and may result in decreased user satisfaction with a computing device having those additional functions. For example, use of a traditional menu may force a user to navigate through multiple levels and selections at each of the levels to locate a desired function, which may be both time consuming and frustrating for the user.

Techniques involving gestures are described. In the following discussion, a variety of different implementations are described that involve gestures to initiate functions of a computing device. In this way, a user may readily access the functions in an efficient and intuitive manner without encountering the complexities involved using conventional access techniques. A variety of different gestures are contemplated, further discussion of which may be found in relation to the following sections.

In the following discussion, an example environment is first described that is operable to employ the gesture techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
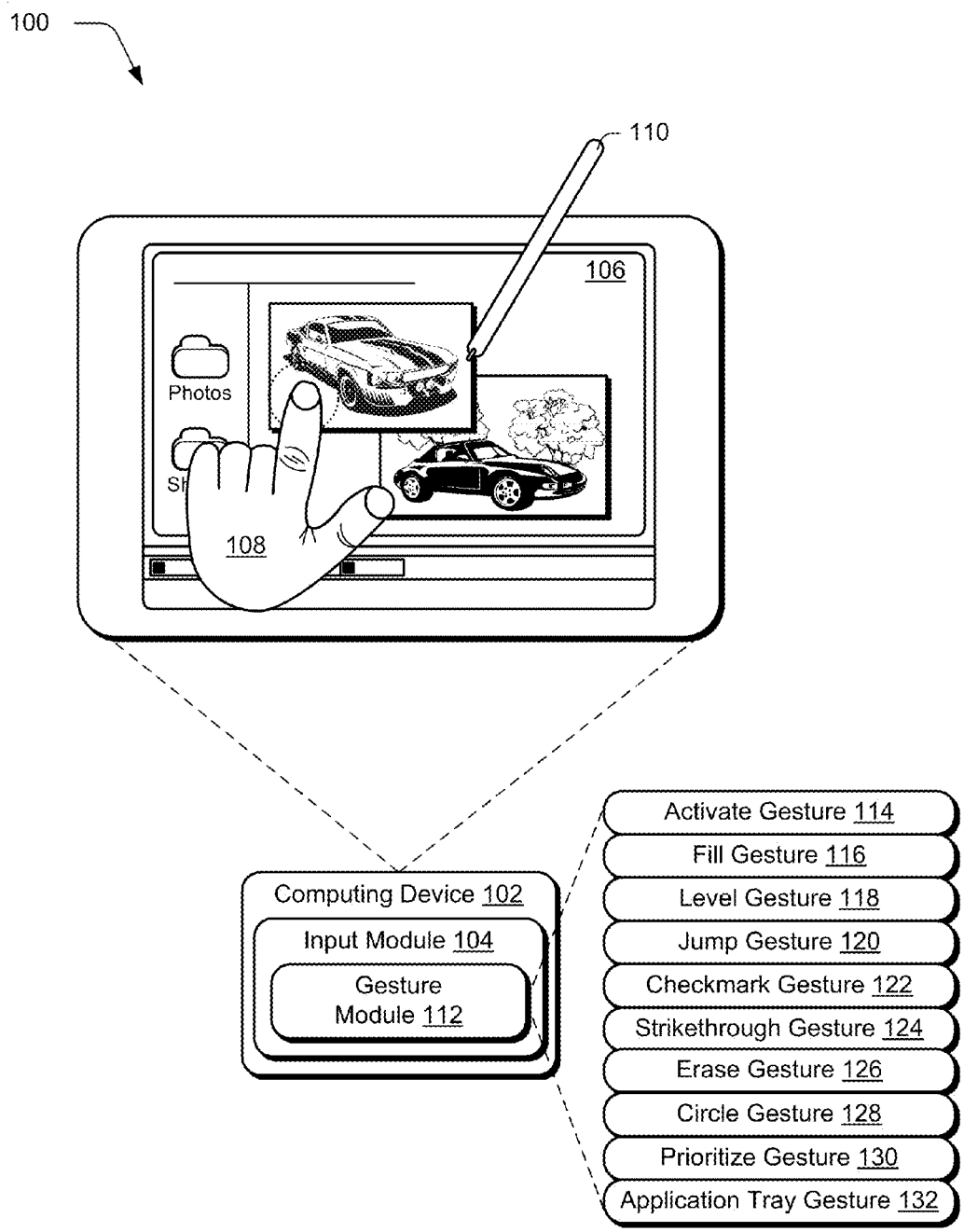
FIG. 1 is an illustration of an environment in an example implementation that is operable to employ gesture techniques described herein.

FIG. 1 is an illustration of an environment 100 in an example implementation that is operable to employ gesture techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures, functionality of which is represented by a gesture module 112.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 108 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI). A variety of other example techniques for distinguishing touch and stylus inputs are contemplated, further discussion of which may be found in relation to FIG. 24.

Thus, the gesture module 112 of the input module 103 may support a variety of different gesture techniques by recognizing and leveraging a division between stylus and touch inputs. For instance, the gesture module 112 may be configured to recognize the stylus as a writing tool, whereas touch is employed to manipulate objects displayed by the display device 108. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

The gesture module 112 may support a variety of different gestures. Examples of gesture described herein include an activate gesture 114, a fill gesture 116, a level gesture 118, a jump gesture 120, a checkmark gesture 122, a strikethrough gesture 124, an erase gesture 126, a circle gesture 128, a prioritize gesture 130, and an application tray gesture 132. Each of these different gestures is described in a corresponding section in the following discussion. Although different sections are used, it should be readily apparent that the features of these gestures may be combined and/or separated to support additional gestures. Therefore, the description is not limited to these examples.

Additionally, although the following discussion may describe specific examples of touch and stylus inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices, further discussion of which may be found in relation to the following figure.

Figure 2:
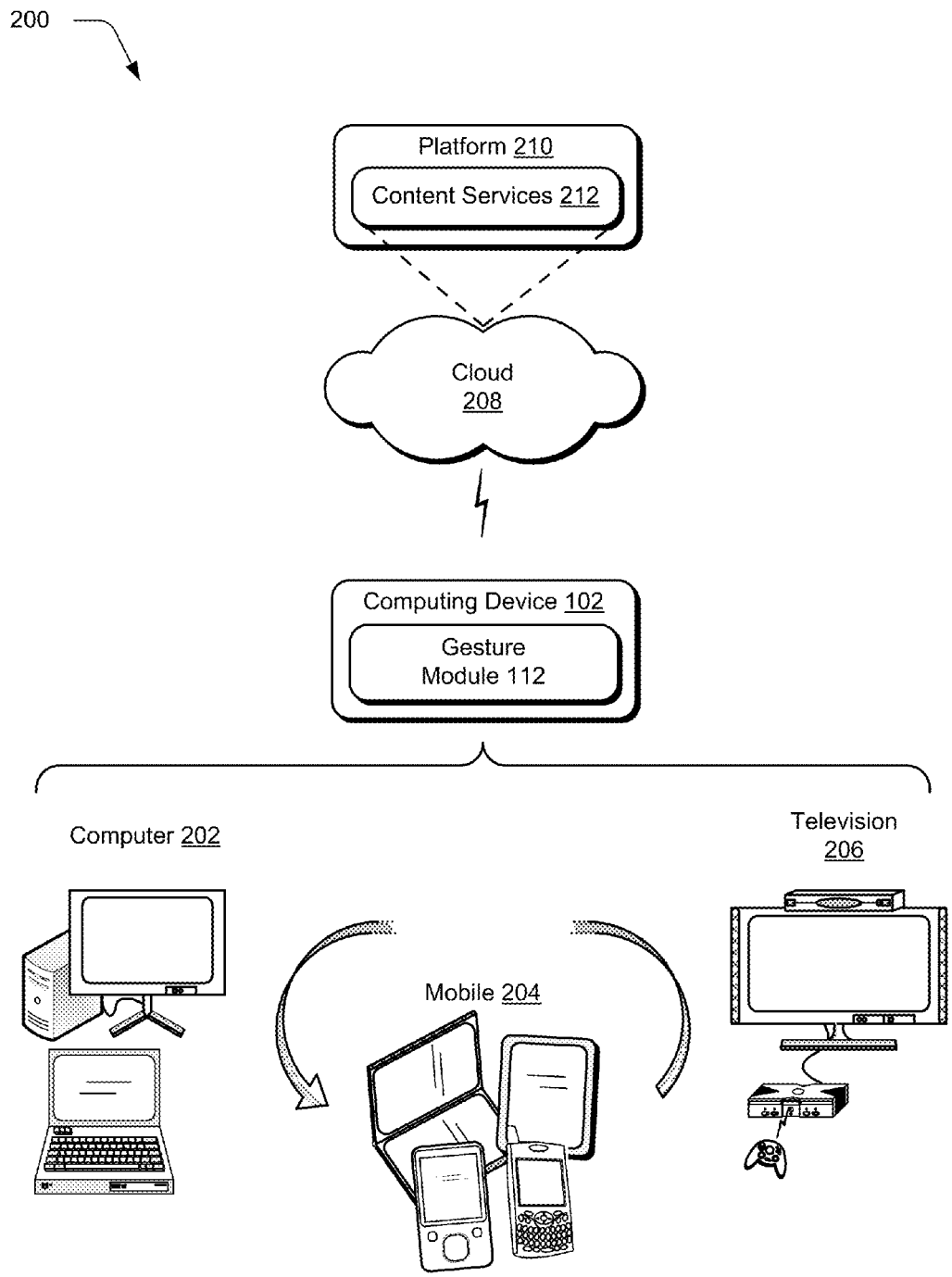
FIG. 2 illustrates an example system showing a gesture module of FIG. 1 as being implemented using in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The gesture techniques described herein may be supported by these various configurations of the client device 102 and are not limited to the specific examples of gesture techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the client device 102. Content services 212 can be provided as a service over the Internet and/or through a subscriber network, such as a cellular or WiFi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the gesture module 112 may be distributed throughout the system 200. For example, the gesture module 112 may be implemented in part on the computing device 102 as well as via the platform 210 that abstracts the functionality of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Activate Gesture

Figure 3:
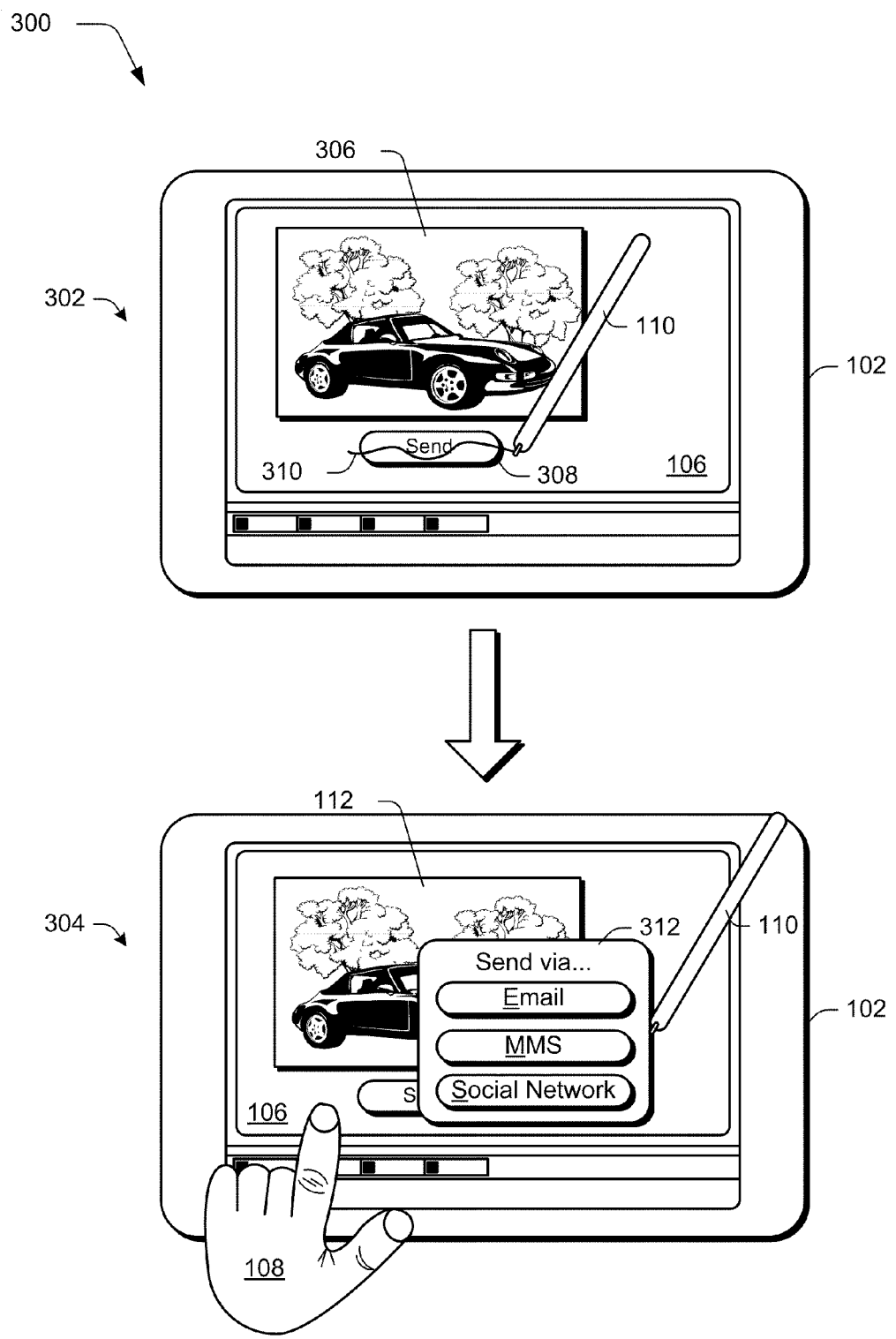
FIG. 3 is an illustration of an example implementation in which stages of an activate gesture of FIG. 1 are shown as being input through interaction with a computing device.

FIG. 3 is an illustration of an example implementation 300 in which stages of the activate gesture 114 of FIG. 1 are shown as being input through interaction with the computing device 102. The activate gesture 114 is illustrated in FIG. 3 using first and second stages 302, 304. At the first stage 302, an image 306 is displayed by the display device 108 of the computing device 102. A control 308 is illustrated as a button that is displayed beneath the image 306 in the user interface, which is this instance is configured to send the image 306 as further discussed below.

A line 310 is also illustrated as being drawn at least partially through the control 308 by a stylus 110. For example, a user may grasp the stylus 110 and move it across a display of the control 308 on the display device 106. Functionality of the computing device 102 (e.g., the gesture module 114) may recognize this movement and display the line 310 as following a path of the movement.

At the second stage 304, the computing device 102 has identified the activate gesture 114 from the inputs that were recognized from the first stage 302. In response to this identification, the computing device 102 may initiate an action to be performed that corresponds to the control 308, which in this instance is display of a menu 312. The menu 312 in this example includes representations of additional options for sending the image 306 which as illustrated include "Email," "MMS," and "Social Network."

Additionally, the gesture module 112 may be configured to remove the display of the line 310 upon recognition of the gesture as shown in the second stage, thereby removing perceived clutter on the display device 106. Thus, the line 310 may be drawn using "temporary ink" in this example to show interaction but then be removed once the interaction intended by the ink (e.g., to activate the control in this example through the activate gesture 114) is recognized by the computing device 102. However, it should be readily apparent that a wide variety of other embodiments are also contemplated, e.g., in which display of the line 310 continues, removal of the display of the line 310 after a defined amount of time, and so on. Thus, in this example the drawing of the line may be used to active an "underlying" control. Further discussion of the activation gesture may be found in relation to the following figure.

Figure 4:
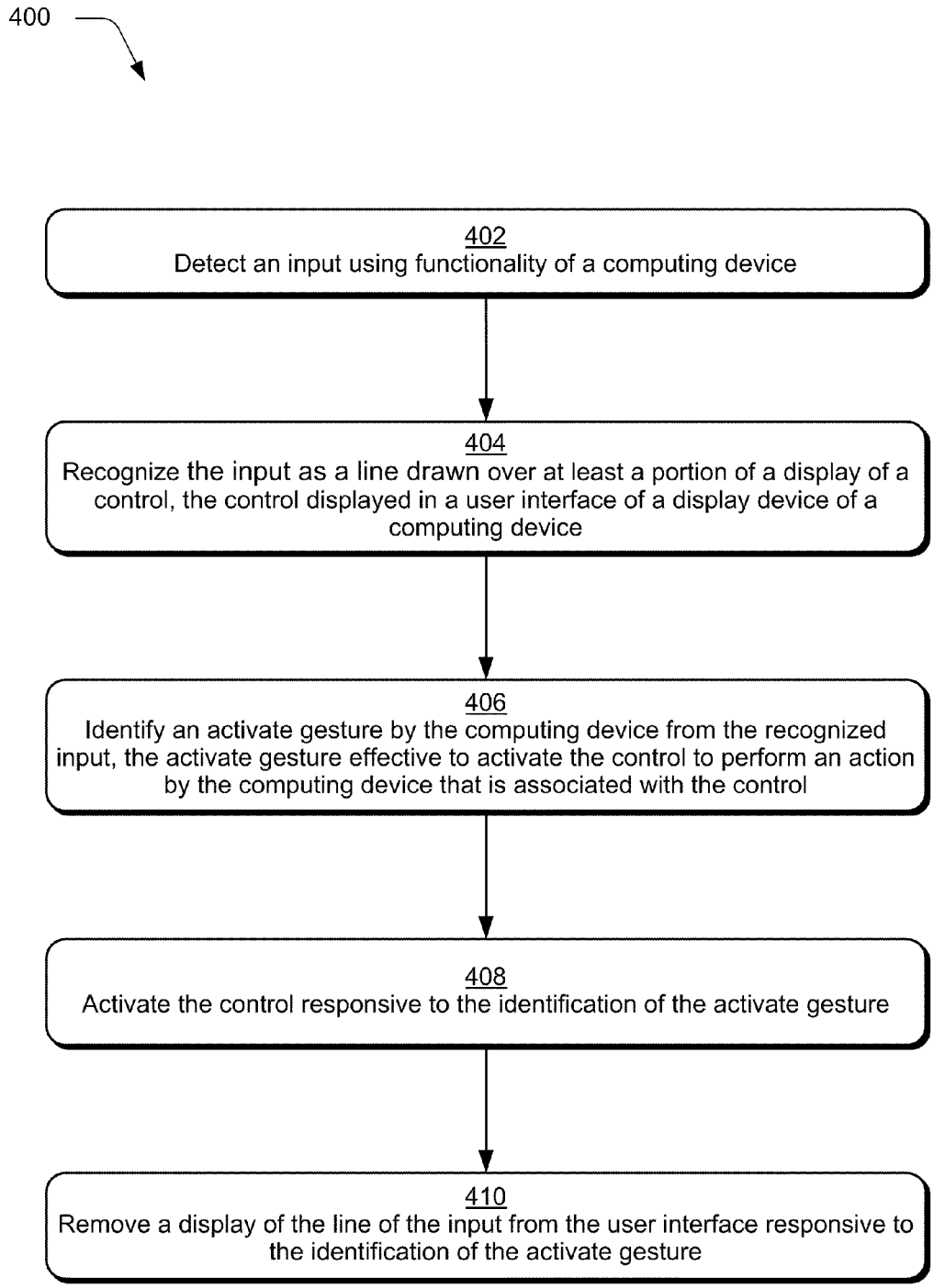
FIG. 4 is a flow diagram that depicts a procedure in an example implementation of an activate gesture in accordance with one or more embodiments.

FIG. 4 is a flow diagram that depicts a procedure 400 in an example implementation of the activate gesture 114 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is detected using functionality of the computing device 102 (block 402). For example, touchscreen functionality may be used to detect a touch input from a finger of a user's hand 108, from a stylus 110, and so on. In another example, a natural user interface is contemplated, which may involve capture of gestures using a camera and may be performed without involving contact with the computing device 102. A variety of other examples are also contemplated.

The input is recognized as a line drawn over at least a portion of a display of the control, the control displayed in a user interface of a display device of the computing device (block 404). The gesture module 112, for instance, may recognize the line 310 and a control 308 over which the line 310 was drawn.

The computing device may then identify an active gesture from the recognized input, the activate gesture effective to active the control and to perform an action by the computing device that is associated with the control (block 406). The control is then activated responsive to the identification of the activate gesture (block 408). As shown in FIG. 3, for instance, the identification of the active gesture for the control 308 may cause a menu 312 to be output that includes selections for sending an image 306.

Additionally, the line that was drawn may be automatically removed from display in the user interface responsive to the identification of the activate gesture (block 410). As previously described, this technique may provide a "temporary ink display" such that lines that are used to active control do not remain behind and clutter the display. Although this examples describes the activate gesture 114 in conjunction with a display of a control as a button, a variety of other controls may also be activated using this gesture, such as to set a value on a slider control, select a box, fill a portion, and so on, further examples of which may be found in relation to the following gestures.

Fill Gesture

Figure 5:
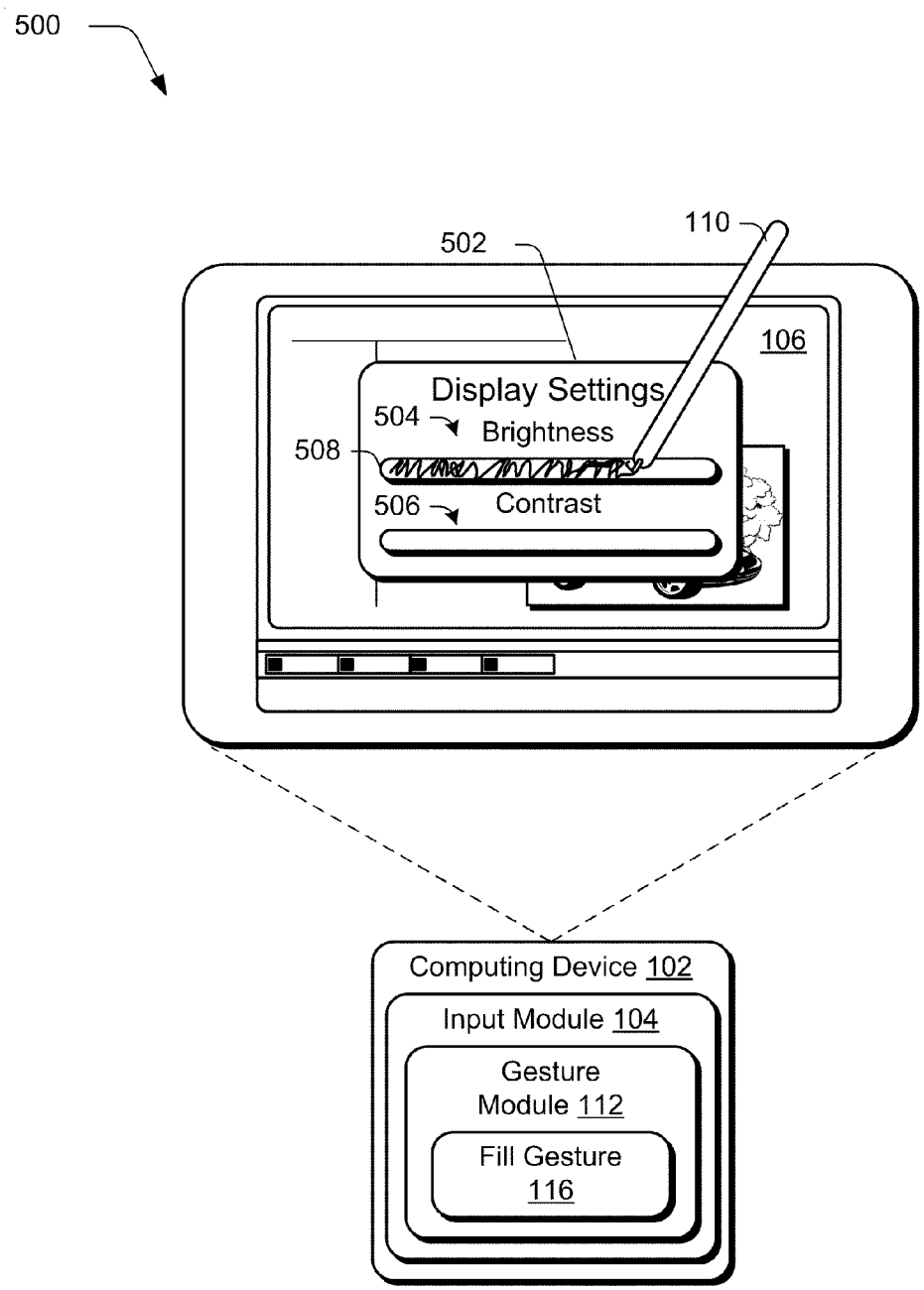
FIG. 5 is an illustration of an example implementation in which a fill gesture of FIG. 1 is shown as being input through interaction with a computing device.

FIG. 5 is an illustration of an example implementation 500 in which stages of the fill gesture 116 of FIG. 1 are shown as being input through interaction with the computing device 102. A user interface is illustrated in this example as including a menu 502 to set display settings of the display device 106 of the computing device 102. In this example, the menu 502 includes a brightness control 504 to set the brightness of the display device 106 and a contrast control 506 to set the contrast of the display device 106.

The brightness control 504 is further illustrated as including a segment 508 that is configured to set a value for the control. In this example, the value of the brightness control 504 is set by filling a portion of the segment 508. The fill of the segment may be performed by drawing one or more lines within the segment 508 by a stylus 110 (e.g., as a squiggle, as a straight line, and so on), although the fill may also be specified by a touch input without departing from the spirit and scope thereof.

Thus, the filled portion may be used to specify a value that is to be applied to perform an action associated with the control. As shown in the illustrated example, the fill may specify a value for the amount of brightness to be used by the display device. For instance, the control may be associated with a plurality of levels (e.g., 0 to 10) and the input may be identified as filling a portion of the segment 508 of the brightness control 504 to indicate a particular one of the levels at which the brightness is to be set. Other instances are also contemplated, such as to set a value that corresponds to the proportion of the segment 508 that is filled.

In implementations, the gesture module 112 may apply the fill gesture 116 in real time as the inputs are received by the computing device 102. For example, the stylus 110 may be used to progressively fill the segment 508 of the brightness control 504. In response, the gesture module 112 may adjust the brightness of the display device 106 in accordance. In this way, the computing device 102 may provide feedback regarding the effect of the fill gesture 116 as it is recognized, further discussion of which may be found in relation to the following figure.

Figure 6:
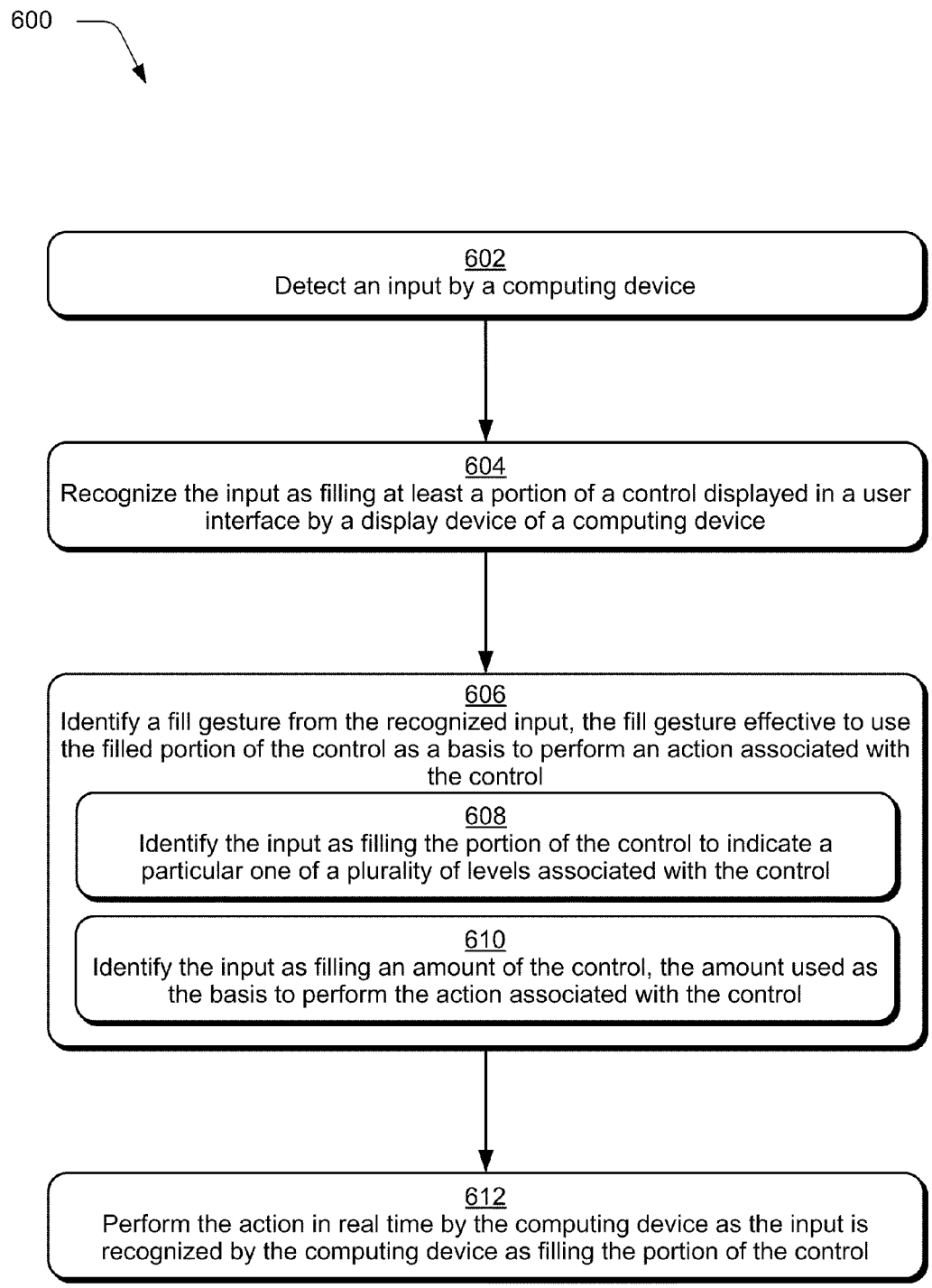
FIG. 6 is a flow diagram that depicts a procedure in an example implementation of a fill gesture of FIG. 1 in accordance with one or more embodiments.

FIG. 6 is a flow diagram that depicts a procedure 600 in an example implementation of the fill gesture 116 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is detected by a computing device (block 602). As before, the input may be detected in a variety of ways, such as by using touchscreen functionality, by a camera in a natural user interface (NUI), and so on.

The input is recognized as filling at least a portion of a control displayed in a user interface by a display device of a computing device (block 604). As shown in FIG. 5, for instance, a line drawn by the stylus 110 may be recognized as filing a portion of the segment 508 of the brightness control 504. It should also be noted that, as illustrated, the "fill" may be provided without completely "coloring in" a portion of the segment 508. Rather, the line may be recognized as filing the portion of the segment 508 using a variety of different techniques, such as by measuring a portion of the segment 508 over which the line is drawn.

A fill gesture is identified from the recognized input, the fill gesture effective to use the filled portion of the control as a basis to perform an action associated with the control (block 606). For example, the input may be identified as filling the portion of the control to indicate a particular one of a plurality of levels associated with the control (block 608). Thus, in this example the fill may be used to specify a particular value, e.g., "5" in a scale of 1 to 10, a particular letter, and so on. In another example, the input may be identified as filling an amount of the control, the amount used as the basis to perform the action associated with the control (block 610), such as by specifying a particular proportion of a segment 508 that is filled, e.g., a percentage. A variety of other examples are also contemplated.

In implementations, the action is performed in real time by the computing device as the input is recognized by the computing device as filling the portion of the control (block 612). As described above, for instance, the fill may be used to specify a particular one of a plurality of levels. Thus, a user may continue to fill in a segment 508 and have a corresponding effect output as feedback in real time, such as to change brightness on the display device 106, adjust the contrast control 506, and so on. Thus, the effect of the input may be displayed using a non-modal technique and may not involve a user selecting another control (e.g., "apply") to view a result of the input. A variety of other examples are also contemplated, such as to utilize modal techniques.

Level Gesture

Figure 7:
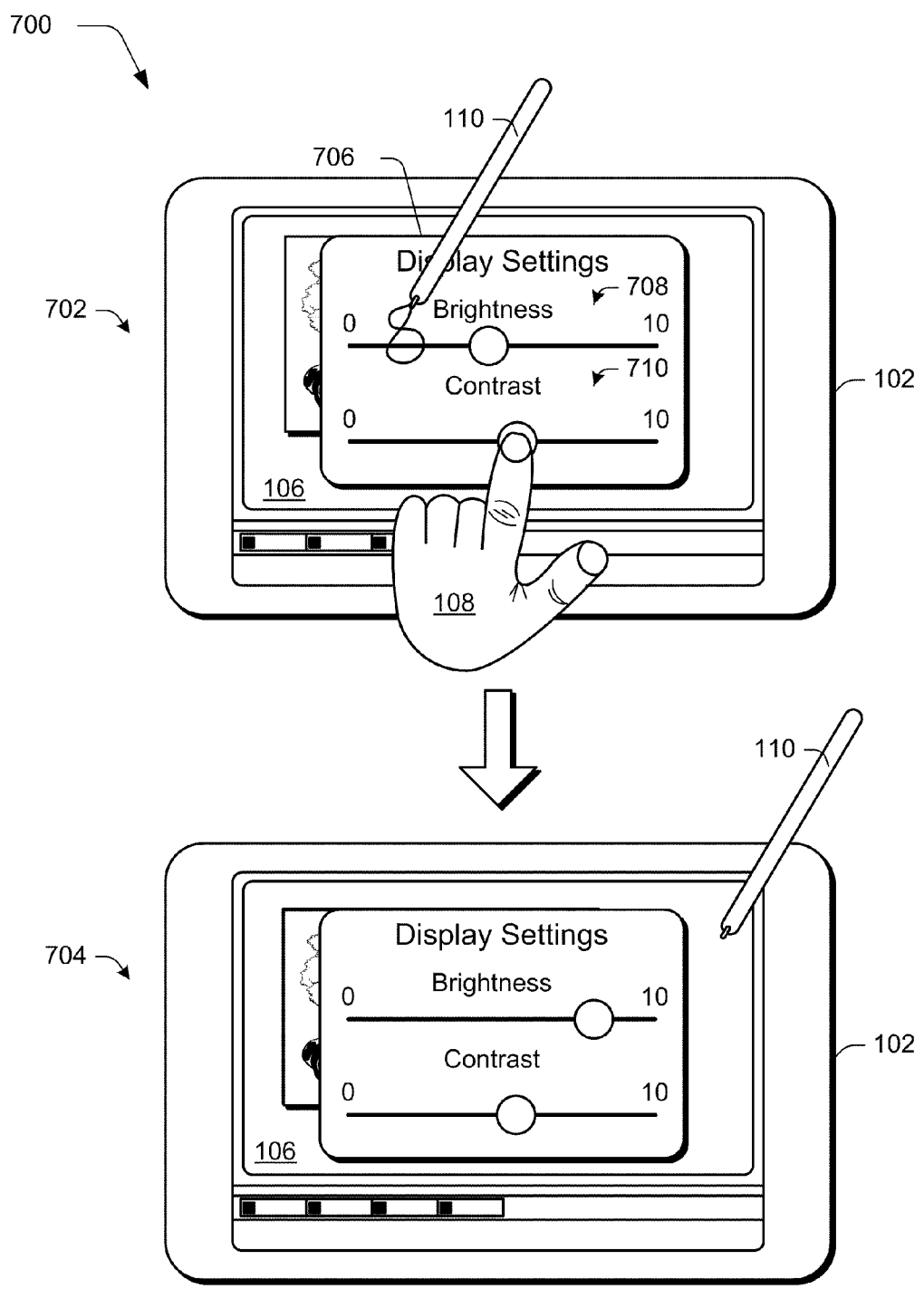
FIG. 7 is an illustration of an example implementation in which stages of a level gesture of FIG. 1 are shown as being input through interaction with a computing device.

FIG. 7 is an illustration of an example implementation 700 in which stages of the level gesture 118 of FIG. 1 are shown as being input through interaction with the computing device 102. The level gesture 118 is illustrated in FIG. 7 using first and second stages 702, 704. At the first stage 702, a menu 706 is output as before that includes a brightness control 708 and a contrast control 710. In this instance, however, the controls are displayed as slider controls to set the values for the corresponding control. For example, the stylus 110, a finger of the user's hand 108, and so on may select a portion of the control and move along the line to set a value for the control, an example of which is shown by the finger of the user's hand 108 in relation to the circle portion of the contrast control 710. Thus, the circle portion may be used to both set a value and also indicate a value at which the control is currently set.

The controls in this example may also be set through use of a level gesture 118. For example, a freeform line is illustrated in the first stage 702 as being drawn by the stylus 110, which indicates a number "8." Responsive to this input, the gesture module 112 may determine that the freeform line is associated with the brightness control 708, such as be determining that the freeform line is drawn at least partially over the display of the brightness control 708.

The gesture module 112 may also determine a value to be set by the freeform line, such as by using an ink analysis engine to determine which characters, if any, are drawn by the freeform line. This analysis may then serve as a basis to set the control, an example of which is shown in the next stage.

At the second stage 704, a result of the level gesture is shown, which in this case is to set the brightness control to a level "8," which is indicated by the circle portion of the slider control. The level gesture 118 may also leverage the "temporary ink" techniques described above to remove the display of the freeform line upon recognition of the level gesture 118. It should be noted that in this example the freeform line of the character "8" was drawn over the control, but not at a point at which the brightness control was to be set. Thus, the level gesture may be used to set the value of the slider control in this example without drawing the freeform line over a part of the slider control that corresponds to the desired value, further discussion of which may be found in relation to the following procedure.

Figure 8:
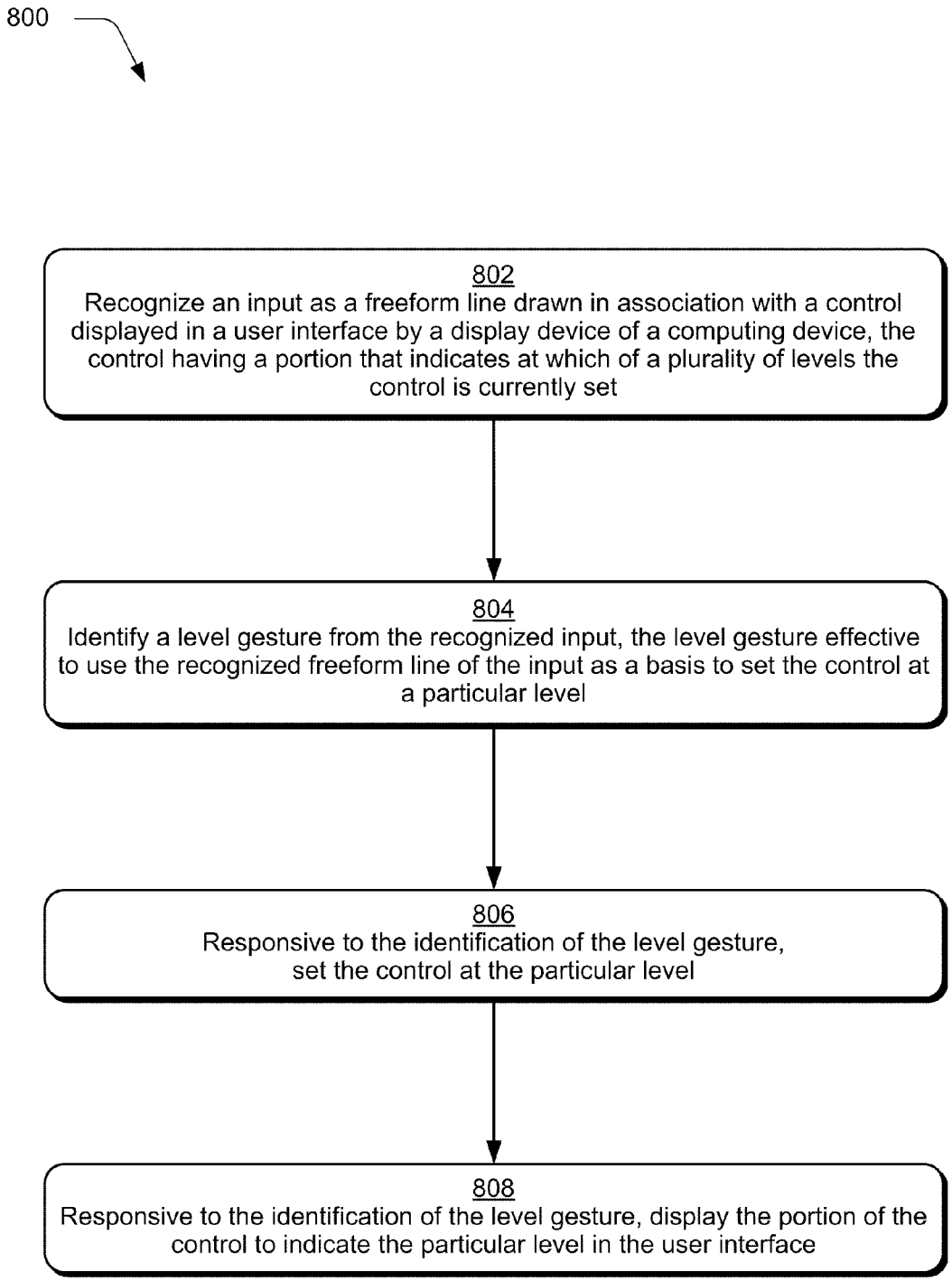
FIG. 8 is a flow diagram that depicts a procedure in an example implementation of a level gesture of FIG. 1 in accordance with one or more embodiments.

FIG. 8 is a flow diagram that depicts a procedure 800 in an example implementation of the level gesture 118 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as a freeform line drawn in association with a control displayed in a user interface by a display device of a computing device, the control having a portion that indicates at which of a plurality of levels the control is currently set (block 802). A variety of freeform lines may be drawn, such as to indicate a particular point on a slider control as illustrated, to write a character (e.g., a letter and/or number), and so on. Thus, the level may be indicated in a variety of ways by the freeform line.

A level gesture is identified from the recognized input, the level gesture effective to use the recognized freeform line of the input as a basis to set the control at a particular said level (block 804). For example, the gesture module 112 may determine that the freeform line corresponds to a particular one of a plurality of controls, such as the brightness control 708 instead of the contrast control 710 because the freeform line is drawn mainly over the brightness control 708.

The gesture module 112 may also utilize ink analysis to determine a likely intent of the freeform line. For example, the gesture module 112 may determine whether the freeform line is configured to indicate a particular point on a slider control by being written over that point. In another example, the gesture module 112 may determine that the freeform line forms one or more characters that indicate a particular level (e.g., "8") of a plurality of levels, e.g., 0 through 10 as illustrated in FIG. 7.

Responsive to the identification of the level gesture, the control is set at the particular level (block 806). Continuing with the previous examples, the gesture module 112 may set the control at a level at which the freeform line crosses the control, at a different level (e.g., when the freeform line specifies one or more characters), and so on.

Also, responsive to the identification of the level gesture the portion of the control is display to indicate the particular level in the user interface (block 808). As shown in FIG. 7, the portion (e.g., the circle of the slider control) may be moved from the first stage 702 to the specified level of the freeform line in the second stage 704. Thus, the portion may indicate a current level at which the control is set. A variety of other controls may also leverage the level gesture without departing from the spirit and scope thereof.

Jump Gesture

Figure 9:
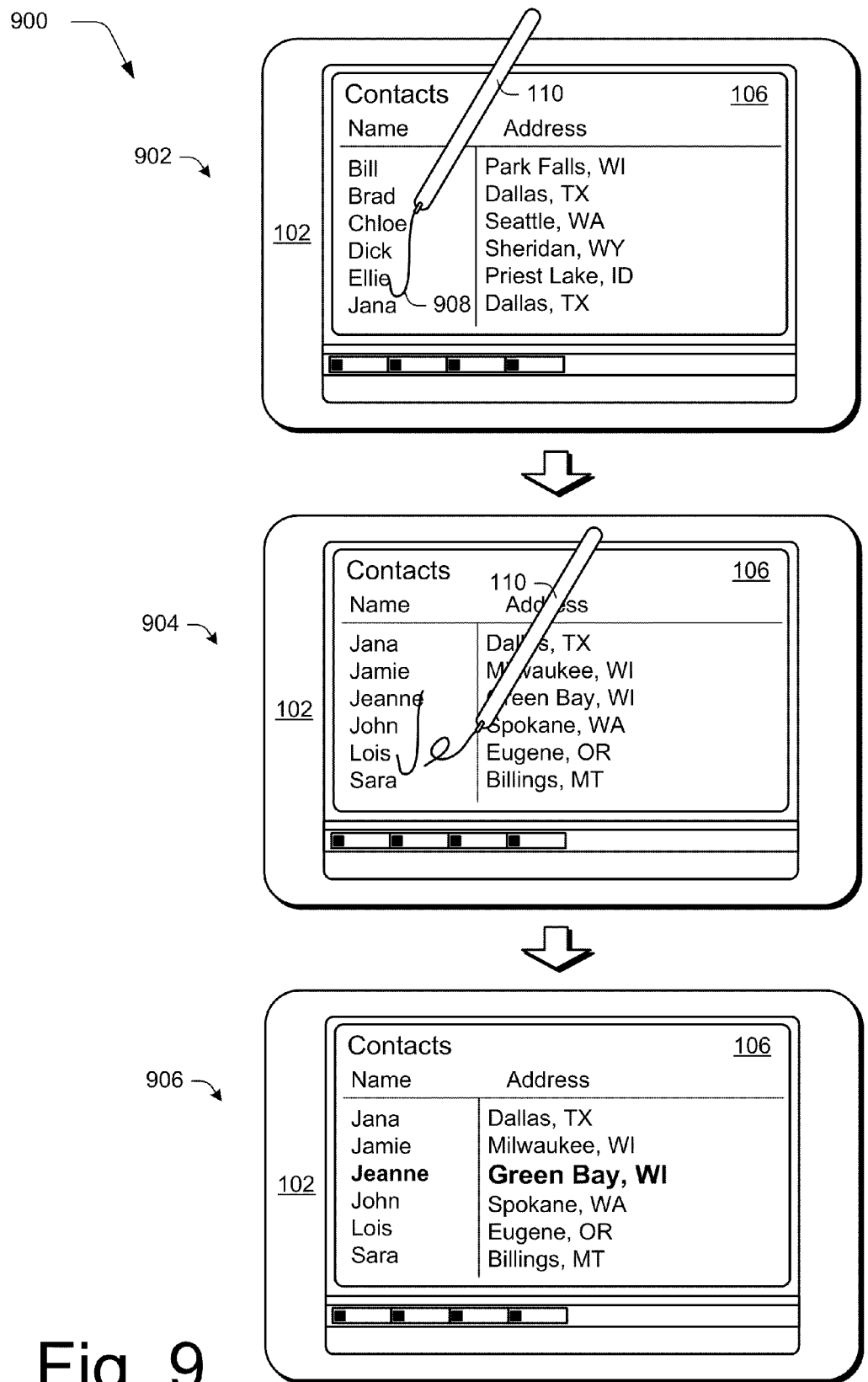
FIG. 9 is an illustration of an example implementation in which stages of a jump gesture of FIG. 1 are shown as being input through interaction with a computing device.

FIG. 9 is an illustration of an example implementation 900 in which stages of the jump gesture 120 of FIG. 1 are shown as being input through interaction with the computing device 102. The jump gesture 120 is illustrated in FIG. 9 using first, second, and third stages 902, 904, 906. At the first stage 902, a user interface is displayed by a display device 106 of the computing device 102. The user interface is configured to output information related to contacts using a plurality of lists arranged in columns. A first column is illustrated as including a name of the contact while a second column is illustrated as including a corresponding address of the named contact.

A freeform line 908 is also illustrated as being drawn using the stylus 110, although a variety of other techniques may also be employed to draw the line, such as a touch input from a finger of the user's hand 108. Responsive to this input, the gesture module 112 may identify a jump gesture 120 from the freeform line (e.g., by identifying a character written by the freeform line 908) and "jump" to one or more items in a corresponding list (e.g., the first column) that include the character.

At the second stage 904, a result of the identification of the character "J" in the freeform line 908 is shown. In this case, the freeform line 908 is associated with the first column that lists names in the contact list by the gesture module 112. As before, this association may be performed in a variety of ways, such as by detecting over which list a majority of the freeform line 908 is drawn.

Accordingly, the gesture module 112 causes a jump to a portion of the contact list that includes that character, and in this case begins with that character. Thus, at the second stage 904 a portion of the name list that includes entries that begin with the letter "J" are displayed. Because the user interface includes room for 6 entries and 4 of them begin with the letter "J" in the list of names, additional entries from the portion are also displayed that do not begin with the letter "J." Other implementations are also contemplated, such as to display entries that include the letter "J," just those entries that begin with the letter "J," and so on.

At the second stage 904, the freeform line is continued to include another character, which is the letter "e" in the illustrated example. Accordingly, the gesture module 112 may continue to leverage the jump gesture 120 to further refine the results in real time as the input is received. For example, the gesture module 112 may further refine a list that is displayed to include items that include both the letters "J" and "e" and display them if not already displayed. However, in an implementation if the item is already displayed that corresponds to those inputs the item may be given "focus" in the user interface, such as by display the item in bold as shown for the entry "Jeanne" in the third stage 906. In this way, the jump gesture 120 may be leveraged to provide intuitive navigation through a list of items, further discussion of which may be found in relation to the following procedure.

Figure 10:
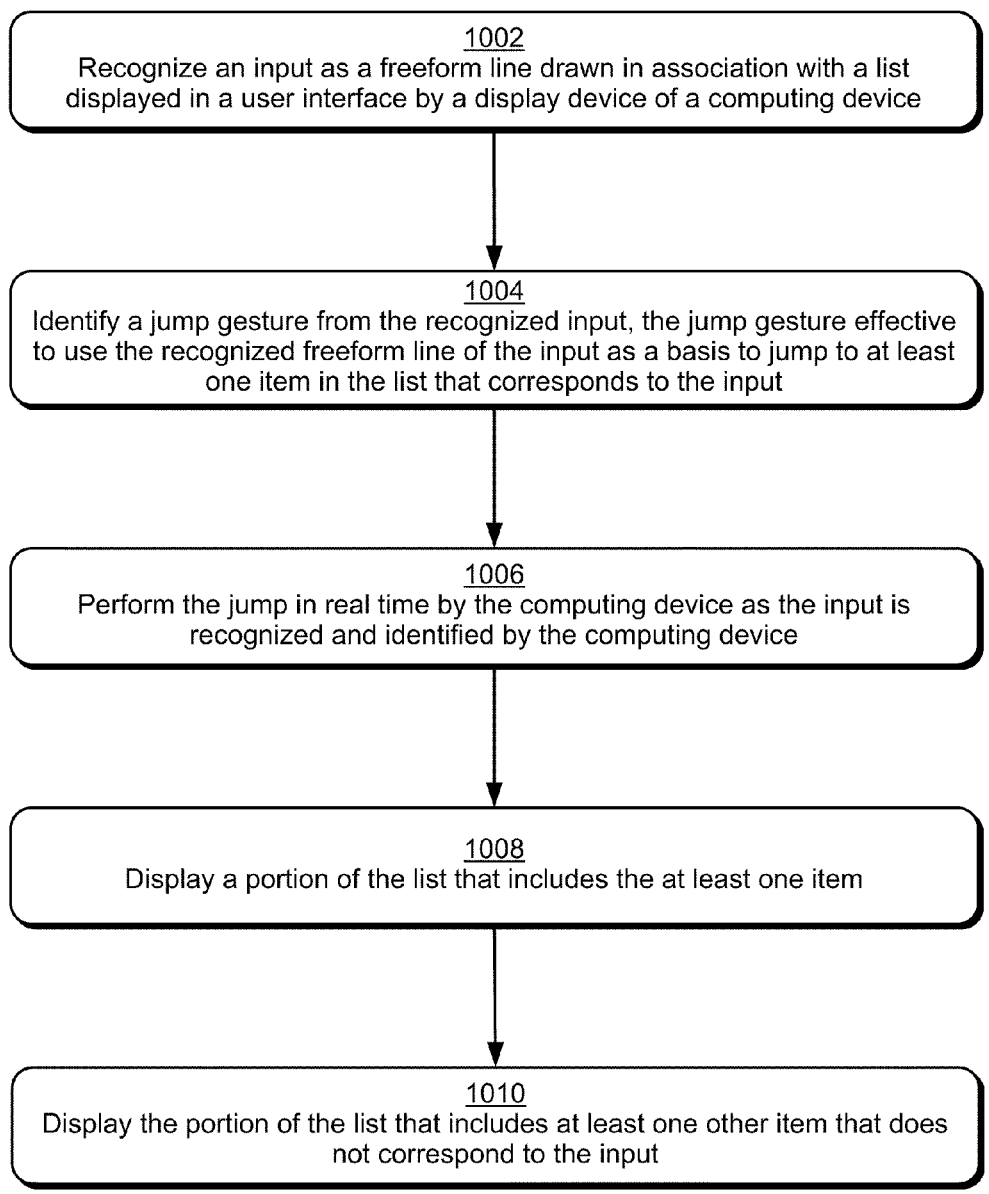
FIG. 10 is a flow diagram that depicts a procedure in an example implementation of a jump gesture of FIG. 1 in accordance with one or more embodiments.

FIG. 10 is a flow diagram that depicts a procedure 1000 in an example implementation of the jump gesture 120 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as a freeform line drawn in association with a list displayed in a user interface by a display device of a computing device (block 1002). For example, the freeform line may be drawn at least partially over one or more items included in the list, an example of which is shown in the first stage 902 of FIG. 9.

A jump gesture is identified from the recognized input, the jump gesture effective to use the recognized freeform line of the input as a basis to jump to at least one item in the list that corresponds to the input (block 1004). The freeform line may describe one or more characters. Accordingly, the gesture module 112 may recognize the characters (e.g., through ink analysis) and that the characters were drawn in association with the list as described above. Thus, these inputs may be used to identify the jump gesture 120.

In one or more implementations, the jump is performed in real time by the computing device as the input is recognized and identified by the computing device (block 1006). For example, the jump may be performed as characters are identified in the freeform line by the gesture module 112.

A portion of the list is displayed that includes the at least one item (block 1008). As shown in the second stage 904 of FIG. 9, for instance, the portion of the list may include entries that contain the character "J." Additionally, the portion of the list may be displayed that does not correspond to the input (block 1010), such as entries "Mike" and "Sara" as also illustrated in the second stage 904. A variety of other examples are also contemplated, such as to give focus to items in the list as the input is received, display items that include the characters and not other items, and so forth.

Checkmark Gesture

Figure 11:
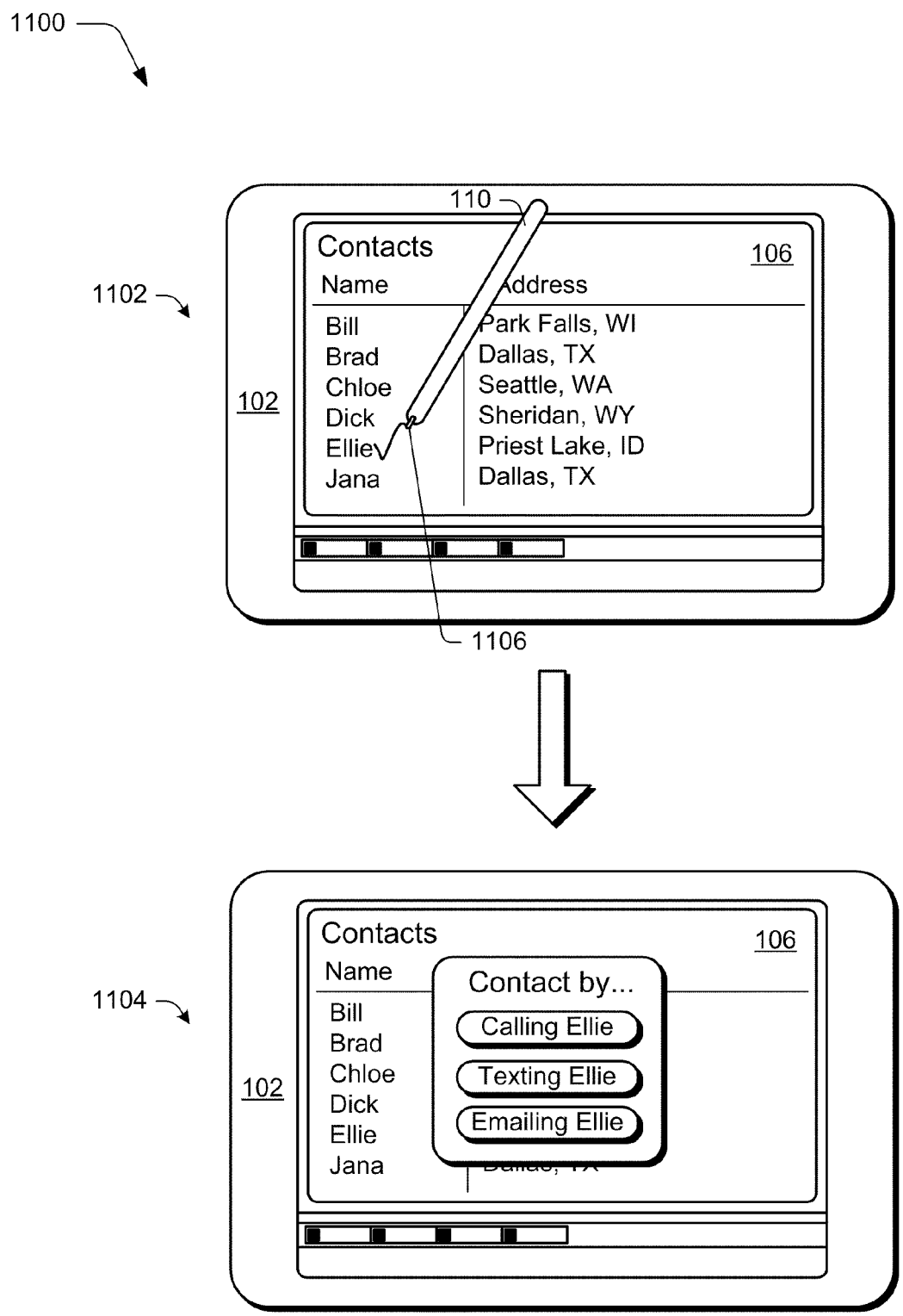
FIG. 11 is an illustration of an example implementation in which stages of a checkmark gesture of FIG. 1 are shown as being input through interaction with a computing device.

FIG. 11 is an illustration of an example implementation 1100 in which stages of the checkmark gesture 122 of FIG. 1 are shown as being input through interaction with the computing device 102. The checkmark gesture 122 is illustrated in FIG. 11 using first and second stages 1102, 1104. At the first stage 1102, a user interface is displayed by a display device 106 of the computing device 102. As before, the user interface in this example is configured to output information related to contacts using a plurality of lists arranged in columns. A first column is illustrated as including a name of the contact while a second column is illustrated as including a corresponding address of the named contact.

A checkmark is illustrated as being drawn as a freeform line using the stylus 110, but may also be performed in a variety of other ways, such as through a touch input using a finger of the user's hand 108, captured via a camera in a natural user interface (NUI), and so on. Responsive to recognition of the checkmark and a determination that the checkmark is associated with an item displayed in the user interface, the gesture module 112 may identify a checkmark gesture 122.

Identification of the checkmark gesture 122 may be leveraged by the gesture module 112 to provide a variety of different functionality. For example, the checkmark gesture 122 may be utilized to select the item to which the gesture is associated. In this instance, selection of the item (e.g., "Ellie" in the list of contacts) may cause output of a menu 1108 as shown in the second stage 1104 that includes options to contact Ellie, examples of which include "Calling Ellie," "Texting Ellie," and "Emailing Ellie." A variety of other actions may be initiated responsive to selection of the item that do not involve output of a menu without departing from the spirit and scope thereof, such as to apply a checkmark to a button to select the button and cause performance of an associated action similar to the activate gesture 114 described in relation to FIGS. 3 and 4.

Figure 12:
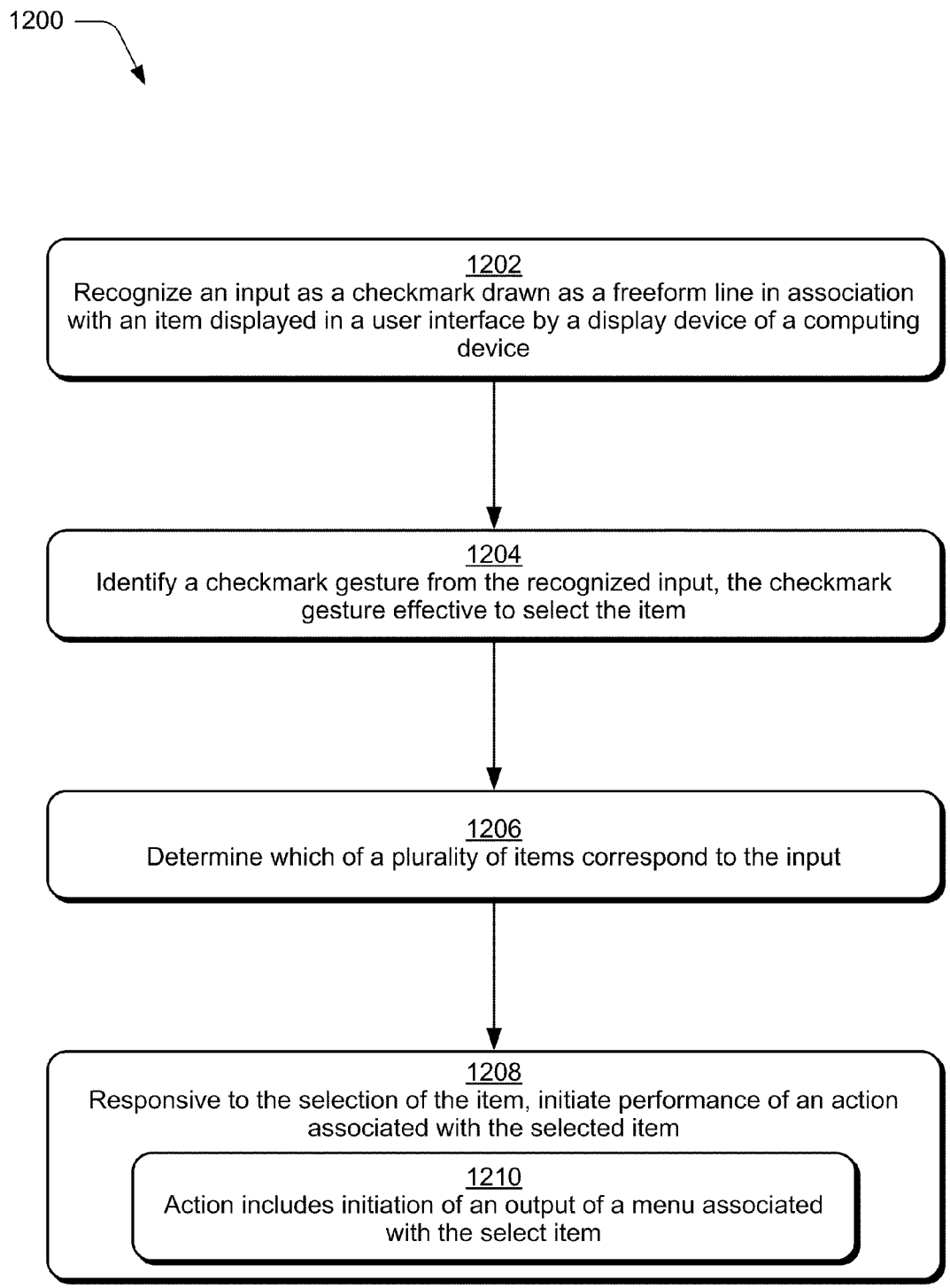
FIG. 12 is a flow diagram that depicts a procedure in an example implementation of a checkmark gesture of FIG. 1 in accordance with one or more embodiments.

FIG. 12 is a flow diagram that depicts a procedure 1200 in an example implementation of the checkmark gesture 122 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as a checkmark drawn as a freeform line in association with an item displayed in a user interface by a display device of a computing device (block 1202). The freeform line, for instance, may be drawn using the stylus 110, a finger of the user's hand 108, made through interaction with a natural user interface (NUI), and so on. Additionally, the freeform line of the checkmark may be drawn over or near the display of the item, such as next to, overlapping at least a portion of the item, and so on.

A checkmark gesture is identified from the recognized input, the checkmark gesture effect to select the item (block 1204). A determination is made as to which of a plurality of items correspond to the input (block 1206). The gesture module 112 may identify the checkmark gesture 122 from the drawing of the mark as well as from what the mark is drawn near, e.g., an item in a list, a control, and so on.

Responsive to the selection of the item performance of an action is initiated that is associated with the selected item (block 1208). For example, the action may include initiation of an output of a menu associated with the selected item (block 1210), performance of an action that does not involve output of a menu (e.g., to perform an action that relates to a displayed control), and so on. Thus, like the activate gesture 114 the checkmark gesture 122 may be utilized to select an item to initiate an operation. The checkmark gesture may also be provided in associated with a displayed segment that corresponds to an item, such as a box that is configured to receive the checkmark. A variety of other examples are also contemplated.

Strikethrough Gesture

Figure 13:
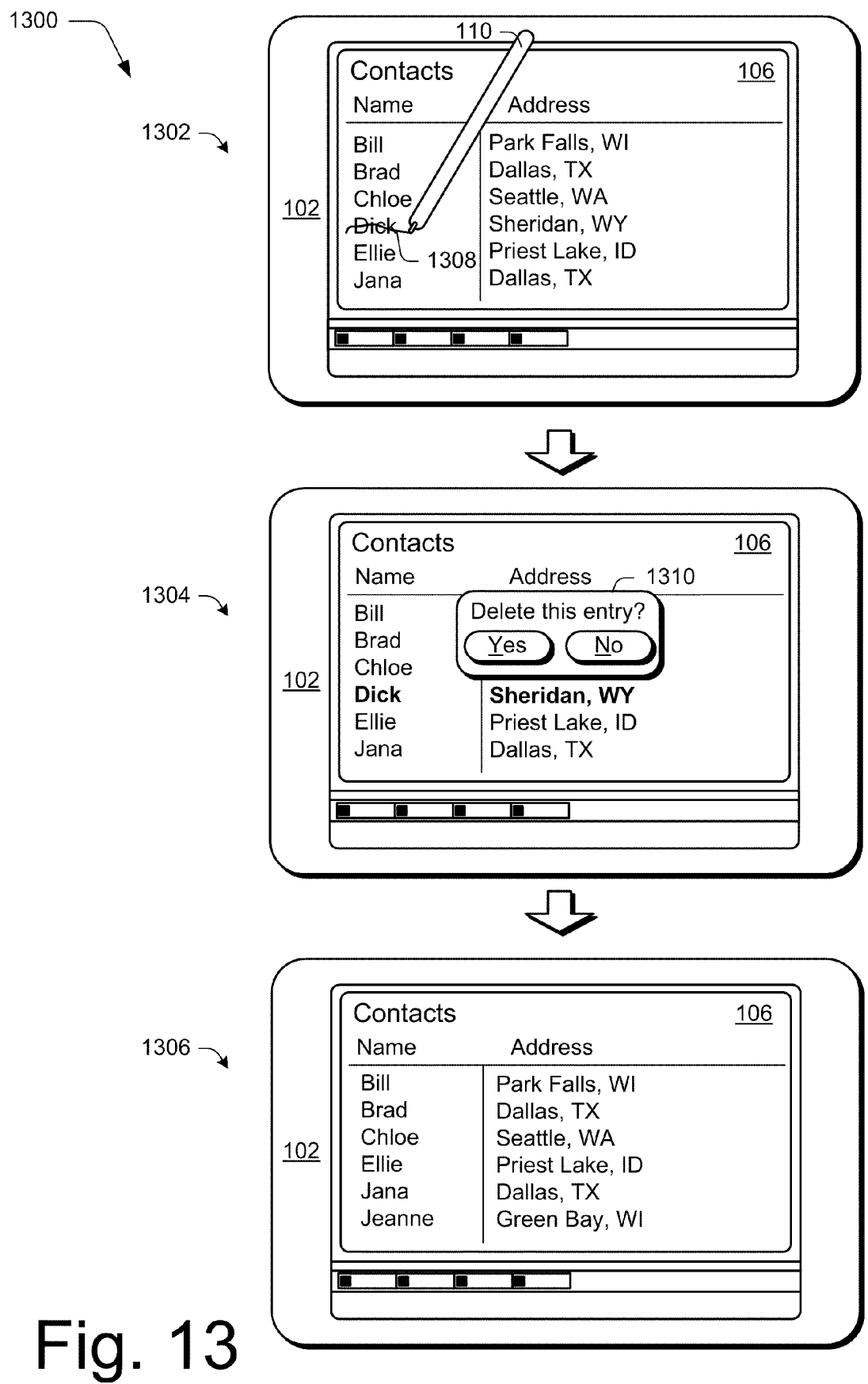
FIG. 13 is an illustration of an example implementation in which stages of a strikethrough gesture of FIG. 1 are shown as being input through interaction with a computing device.

FIG. 13 is an illustration of an example implementation 1300 in which stages of the strikethrough gesture 124 of FIG. 1 are shown as being input through interaction with the computing device 102. The strikethrough gesture 124 is illustrated in FIG. 13 using first, second, and third stages 1302, 1304, 1306. At the first stage 1302, a user interface is displayed by a display device 106 of the computing device 102. As before, the user interface in this example is configured to output information related to contacts using a plurality of lists arranged in columns. A first column is illustrated as including a name of the contact while a second column is illustrated as including a corresponding address of the named contact.

A strikethrough 1308 is illustrated as being drawn as a freeform line using the stylus 110, but may also be performed in a variety of other ways, such as through a touch input using a finger of the user's hand 108, captured via a camera in a natural user interface (NUI), and so on. In the illustrated example, the strikethrough is drawn "over" and/or "through" the display of the item, which is a name is the list of contacts. Responsive to recognition of the strikethrough and a determination that the strikethrough is associated with an item displayed in the user interface, the gesture module 112 may identify the strikethrough gesture 124.

The strikethrough gesture 124 in this example is configured to delete an item associated with the gesture. For example, as shown in the second stage 1304 a menu 1310 may be output in response to identification to verify that the item is to be deleted. The menu 1310 in this instance includes portions that are selectable to cause the item to be deleted (e.g., a "Yes" button) or to cancel the operation (e.g., a "No" button).

Additionally, the item to be deleted in this example is illustrated as having focus through bolding, although other techniques to apply focus to an item are also contemplated, e.g., shadow, lightening of a surround items, and so on. Further, the strikethrough gesture is further illustrated as incorporating functionality of a "temporary ink" display to remove the strikethrough line from the item. In this way, the underlying item may be viewed without interference although other implementations are also contemplated, e.g., such as to keep the strikethrough as an additional form of focus.

The third stage 1306 illustrates an example result of the strikethrough gesture 124. In this instance, the result involves deleting the item from the list that was bolded in the second stage 1304 and struck through in the first stage 1302. Items that were disposed "below" the deleted item in the list are then moved upward in the list. A variety of other examples of use of the strikethrough gesture are also contemplated, such as in conjunction with a word processor, spreadsheet, text messaging, instant messaging, and so on. Additionally, a strikethrough may take a variety of forms, another example which is described in relation to the following figure.

Figure 14:
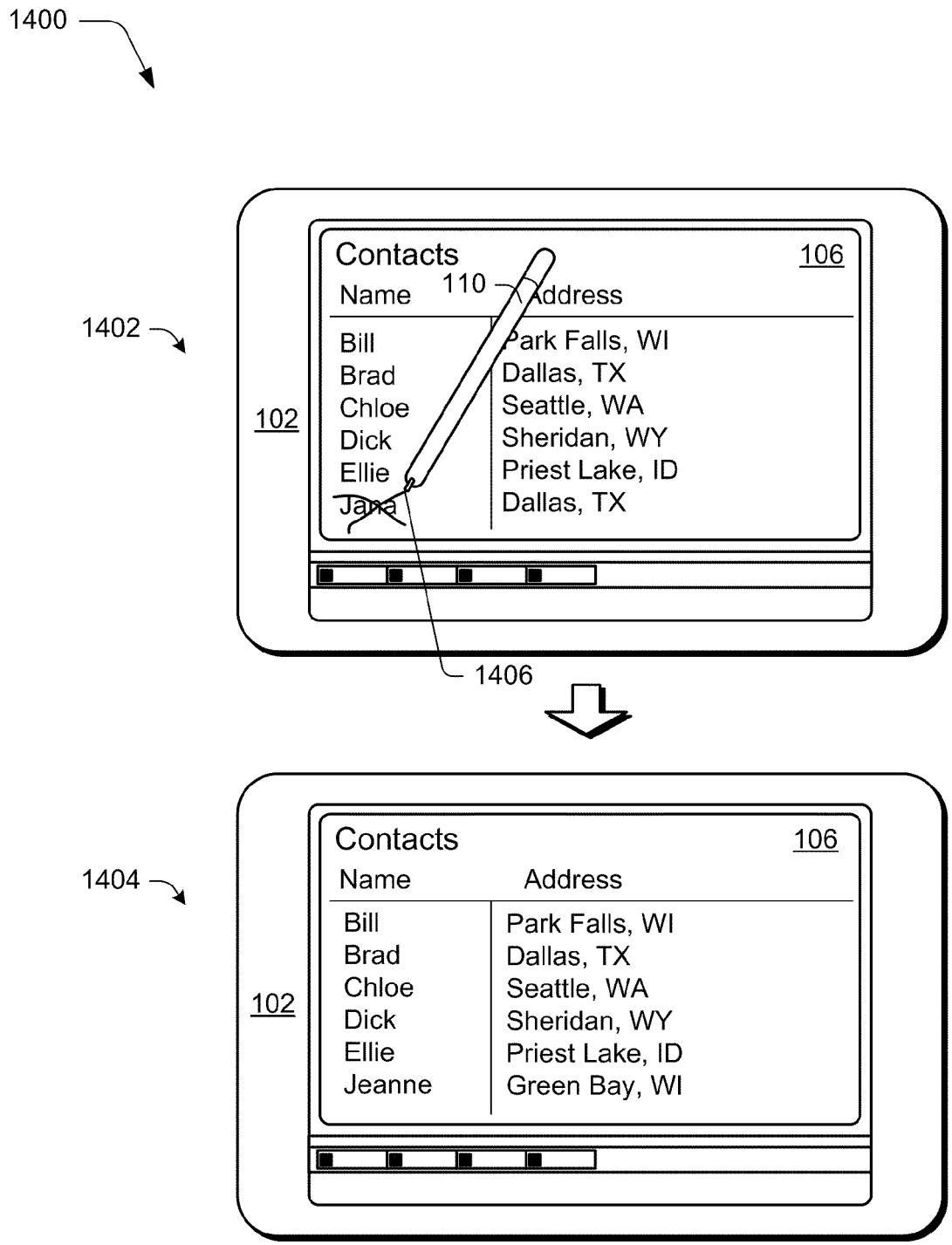
FIG. 14 is an illustration of another example implementation in which stages of a strikethrough gesture of FIG. 1 are shown as being input through interaction with a computing device.

FIG. 14 is an illustration of another example implementation 1400 in which stages of the strikethrough gesture 124 of FIG. 1 are shown as being input through interaction with the computing device 102. The strikethrough gesture 124 is illustrated in FIG. 14 using first and second stages 1402, 1404. At the first stage 1402, a freeform line 1406 is again illustrated as a strikethrough of an item in a list. However, in this example the freeform line 1406 is drawn as an "x-out" of the item. As before, this strikethrough and the associated item may be recognized by the gesture module 112 as the strikethrough gesture 124 and cause the associated item to be deleted as shown in the second stage 1404. A variety of other strikethroughs that include freeform lines that may assume a variety of configurations are also contemplated without departing from the spirit and scope thereof.

Figure 15:
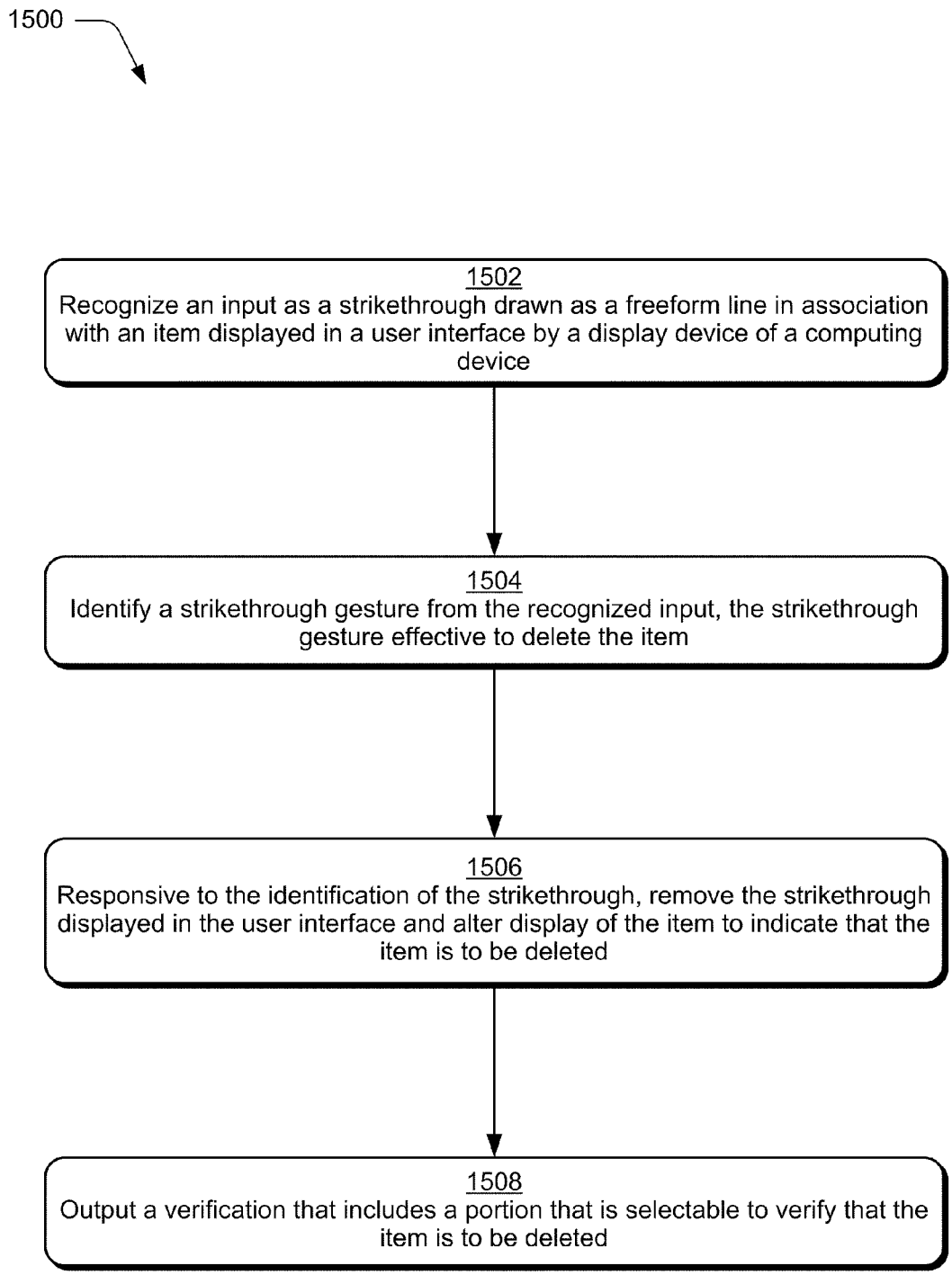
FIG. 15 is a flow diagram that depicts a procedure in an example implementation of a strikethrough gesture of FIG. 1 in accordance with one or more embodiments.

FIG. 15 is a flow diagram that depicts a procedure 1500 in an example implementation of the strikethrough gesture 124 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as a strikethrough drawn as a freeform line in association with an item displayed in a user interface by a display device of a computing device (block 1502). The strikethrough may take a variety of forms, such as a single freeform line as shown in FIG. 13, multiple freeform lines (e.g., an "x-out" as shown in FIG. 14), a "squiggle" that substantially covers the item, and so on. Additionally, the freeform line, for instance, may be drawn using the stylus 110, a finger of the user's hand 108, made through interaction with a natural user interface (NUI), and so on.

A strikethrough gesture is identified form the recognized input, the strikethrough gesture effective to delete the item (block 1504). The gesture module 112, for instance, may identify the strikethrough gesture 124 from the drawing of the line and the corresponding item that is capable of being deleted in the user interface.

Responsive to the identification of the strikethrough, the strikethrough displayed in the user interface is removed and display of the item is altered to indicate that the item is to be deleted (block 1506). As shown in FIG. 13, for instance, "temporary ink" functionality may be employed to remove the display of the ink once the strikethrough gesture is detected. Further, the item may be given focus to verify the particular item that is to be deleted, such as by bolding as shown in the second stage 1304 of FIG. 13, shadow, flashing, lightening or darkening of the surrounding user interface, and so on.

A verification is output that includes a portion that is selectable to verify that the item is to be deleted (block 1508), such as a menu 1310 to confirm that the item is to be deleted before the operation is completed. As previously described, in an implementation the deletion may be performed without verification without departing from the spirit and scope thereof.

Erase Gesture

Figure 16:
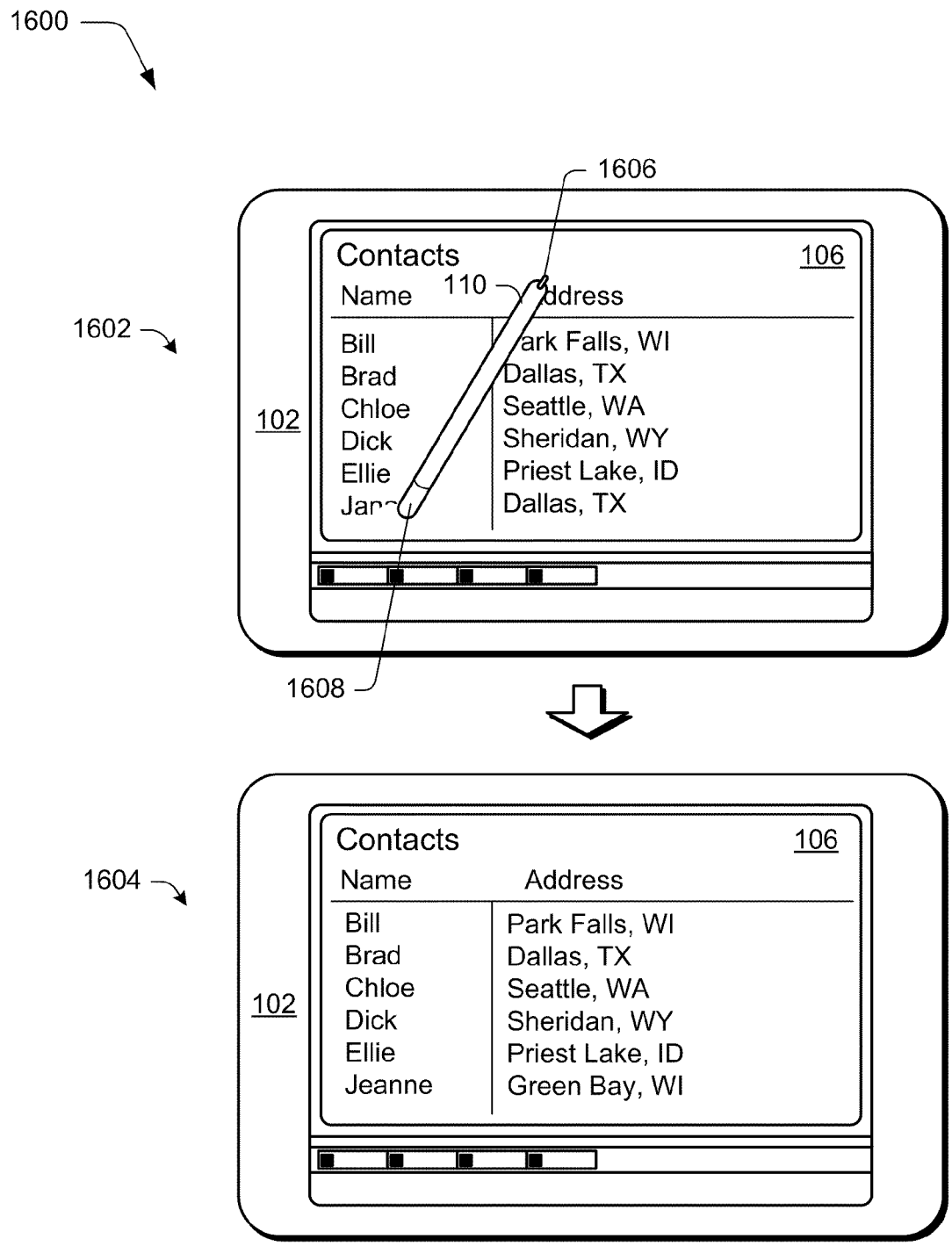
FIG. 16 is an illustration of an example implementation in which stages of an erase gesture of FIG. 1 are shown as being input through interaction with the computing device.
Figure 17:
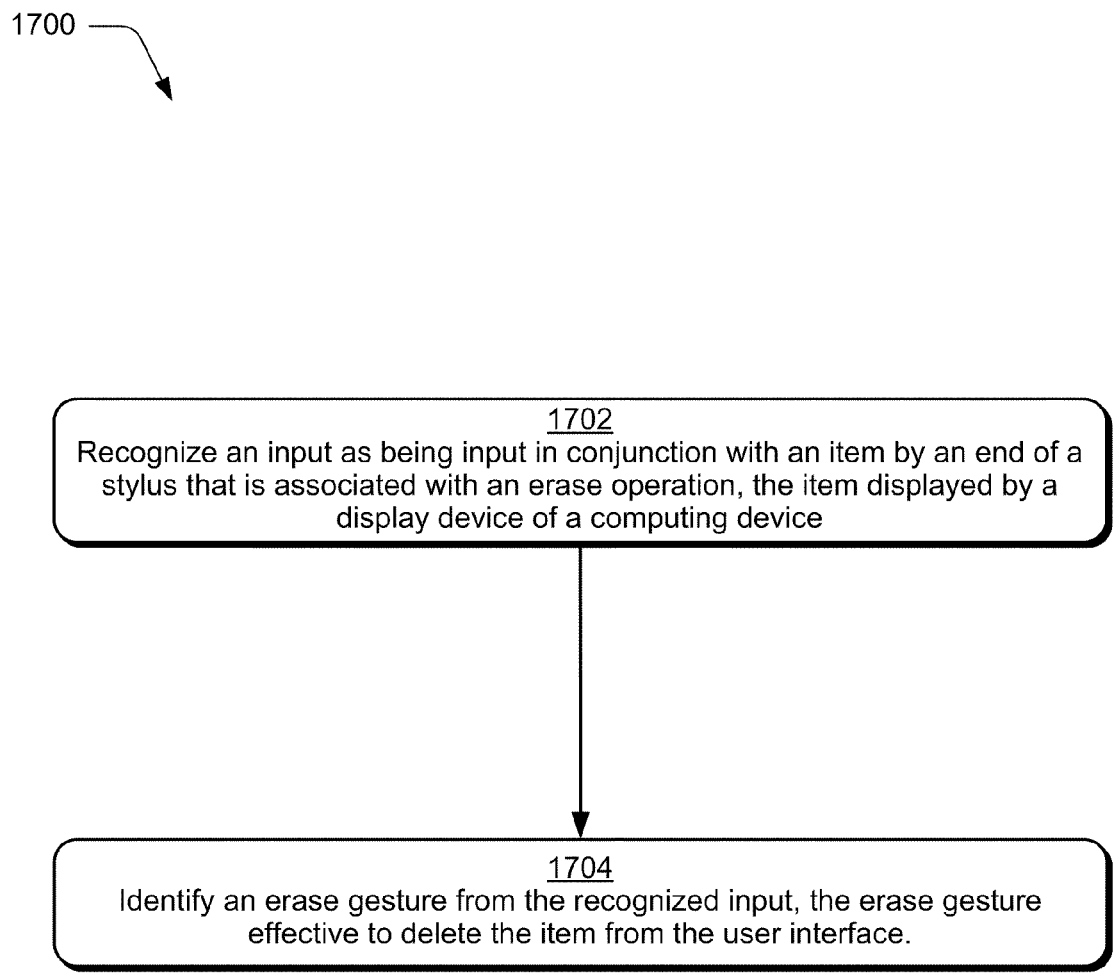
FIG. 17 is a flow diagram that depicts a procedure in an example implementation of an erase gesture of FIG. 1 in accordance with one or more embodiments.

FIG. 16 is an illustration of an example implementation 1600 in which stages of the erase gesture 126 of FIG. 1 are shown as being input through interaction with the computing device 102. The erase gesture 126 is illustrated in FIG. 17 using first and second stages 1702, 1704. At the first stage 1702, a stylus 110 is illustrated. In this example, the gesture module 112 is configured to recognize different ends of the stylus 110 and provide different functionality in accordance. For instance, the gesture module 112 may recognize that a first end 1606 of the stylus 110 is to be used for write operations and a second end 1608 of the stylus is to be used for erase operations. Therefore, the gesture module 112 may identify an erase gesture 126 when the second end 1608 of the stylus 110 is used to interact with an item displayed by the display device 106.

A user, for instance, may rub the second end 1608 of the stylus 110 over an item, such as a name "Jana" in the illustrated example. The gesture module 112 may recognize that the second end 1608 of the stylus 110 is being used and that this use is associated with the name to erase the name. The erase operation may be performed in a variety of ways, such as to erase a portion of the item as illustrated at the first stage 1602 or to erase the item in its entirety upon identification of the erase gesture 126. Thus, a user may utilize the erase gesture 126 to delete an item in user interface in an intuitive manner, as shown by the removal of the item "Jana" in the second stage 1604.

Although "rubbing" the second end 1608 of the stylus 110 has been described in this example, the erase gesture 126 may be initiated in a variety of other ways. For instance, the second end 1608 of the stylus 110 may be used to "tap" a display of the item, a motion may be captured in a natural user interface (NUI) using a camera, and so on, further discussion of which may be found in relation to the following figure.

FIG. 17 is a flow diagram that depicts a procedure 1700 in an example implementation of the erase gesture 126 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as being input in conjunction with an item by an end of a stylus that is associated with an erase operation, the item is displayed by a display device of a computing device (block 1702). For example, the item may be a character, portion of a character, a word, an image, an icon, and so on. To erase the item, a second end 1608 of the stylus 110 as shown in FIG. 16 that is associated with an erase operation may be used to indicate the erase gesture 126, such as to rub the second end 1608 over a display of the item to be erased, to tap the second end 1608 over the display of the item, and so on.

An erase gesture is identified from the recognized input, the erase gesture effective to delete the time from the user interface (block 1704). Continuing with the previous example, the gesture module 112 may identify the erase gesture from the previously described input. In response, the gesture module 112 may erase a corresponding item, such as portions of characters as shown in the first stage 1602 of FIG. 16. Additionally, the item may be defined as a word, image, icon, and so on such that when a portion of the item is erased (e.g., a letter "a" as shown in the first stage 1602) the entirety of the item is caused to be erased by the erase gesture 126, e.g., the entire name "Jana." A variety of other examples are also contemplated, such as to mimic a rubber eraser to lighten a displayed item, and so on.

Circle Gesture

Figure 18:
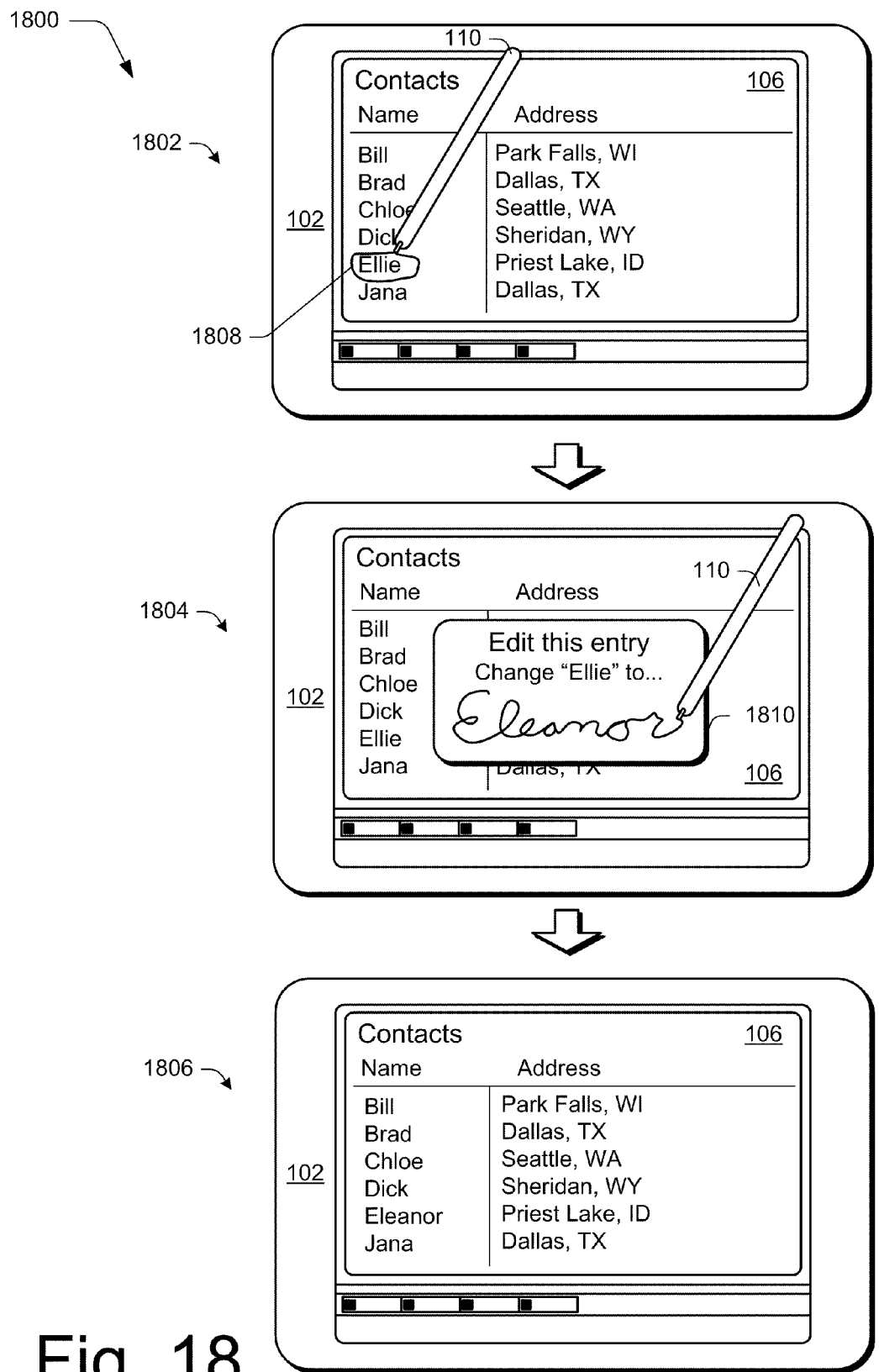
FIG. 18 is an illustration of an example implementation in which stages of a circle gesture of FIG. 1 are shown as being input through interaction with the computing device.

FIG. 18 is an illustration of an example implementation 1800 in which stages of the circle gesture 128 of FIG. 1 are shown as being input through interaction with the computing device 102. The circle gesture 128 is illustrated in FIG. 18 using first, second, and third stages 1802, 1804, 1806. At the first stage 1802, a user interface is displayed by a display device 106 of the computing device 102. As before, the user interface in this example is configured to output information related to contacts using a plurality of lists arranged in columns, including a name column and a corresponding address column.

A circle 1808 is illustrated as being drawn as a freeform line using the stylus 110, but may also be performed in a variety of other ways, such as through a touch input using a finger of the user's hand 108, captured via a camera in a natural user interface (NUI), and so on. In the illustrated example, the circle is drawn around at least a portion of the display of the item, which is a name "Ellie" in the list of contacts. Although a closed (i.e., complete) circle is illustrated, an open circle may also be drawn such that a gap appears between the ends of the freeform line.

Responsive to recognition of the circle and a determination that the circle is associated with an item displayed in the user interface, the gesture module 112 may identify the circle gesture 128. The identification of the circle gesture 128 may then be utilized to select the corresponding item, which in the second stage 1804 is illustrated as causing output of a menu 1810 to edit a name of the contact. In the illustrated implementation, "temporary ink" functionality is employed to remove the freeform line 1808 upon identification of the gesture, although other implementations are also contemplated as previously described.

A user may then draw a freeform line using the stylus 110 in the menu 1810 to edit the selected item in this example, which is to change "Ellie" to "Eleanor." The gesture module 112 may then employ ink analysis to make the change to the contact, a result of which is shown in the third stage 1806 in which the text "Ellie" in the list of names is replaced with "Eleanor."

Although the circle gesture 128 was illustrated as selecting an item in a list, the selection may be performed for a variety of items. For example, the circle gesture 128 may be utilized to select a button in a user interface, an icon, and so on and cause a corresponding action to be performed as a result of the selection. Further discussion of the circle gesture 128 may be found in relation to the following procedure.

Figure 19:
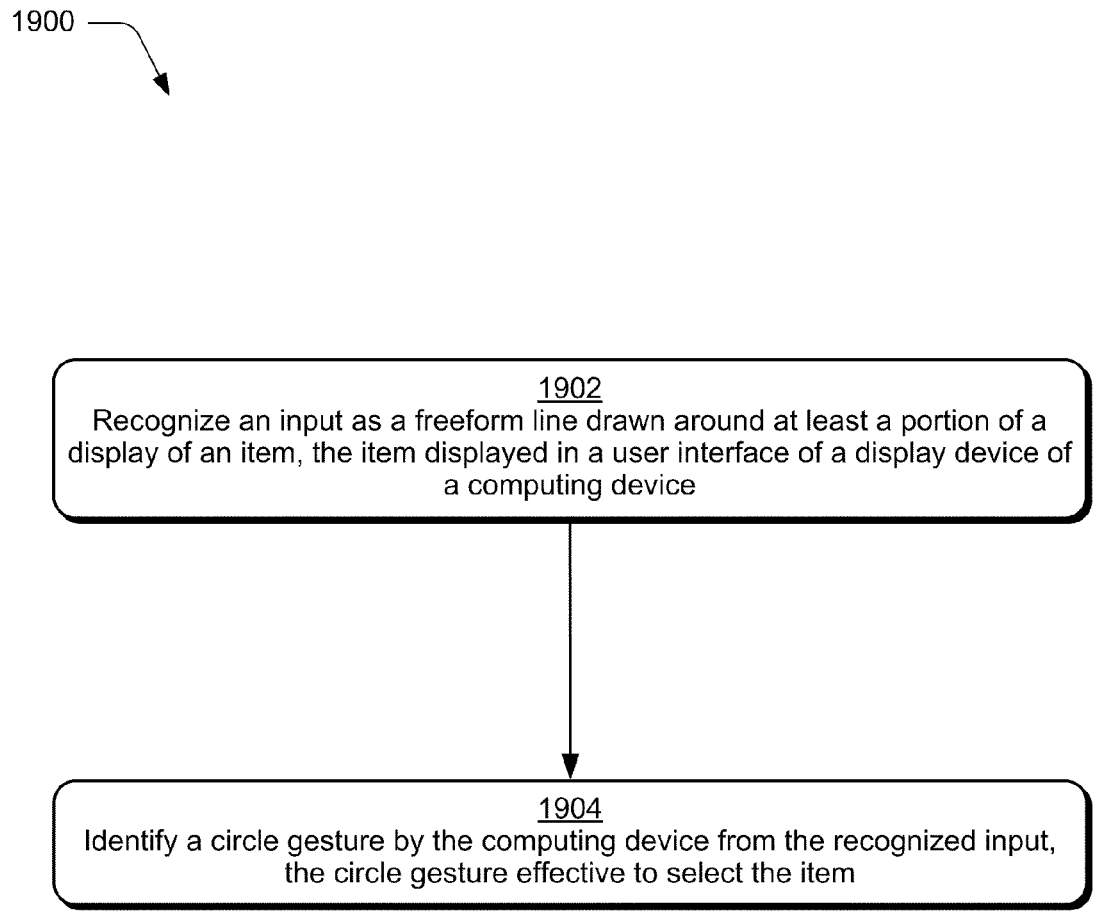
FIG. 19 is a flow diagram that depicts a procedure in an example implementation of a circle gesture of FIG. 1 in accordance with one or more embodiments.

FIG. 19 is a flow diagram that depicts a procedure 1900 in an example implementation of the circle gesture 128 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as a freeform line drawn around at least a portion of a display of an item, the item displayed in a user interface of a display device of a computing device (block 1902). The freeform line, for instance, may be drawn as a circle (which may be complete or open ended) around a button, an item in a list, and so on.

A circle gesture is identified by the computing device from the recognized input, the circle gesture effective to select the item (block 1904). Continuing with the previous example, a user may use a stylus 110, a finger of the user's hand 108, interact with a NUI, and so on to circle or at least partially surround an item to be selected. The gesture module 112 may identify these inputs as a circle gesture 128 and select an item associated with the gesture, such as the button, and item on a list, an icon, and so on. Thus, the gesture module 112 may be configured to utilize a variety of inputs to select an item.

Prioritize Gesture

Figure 20:
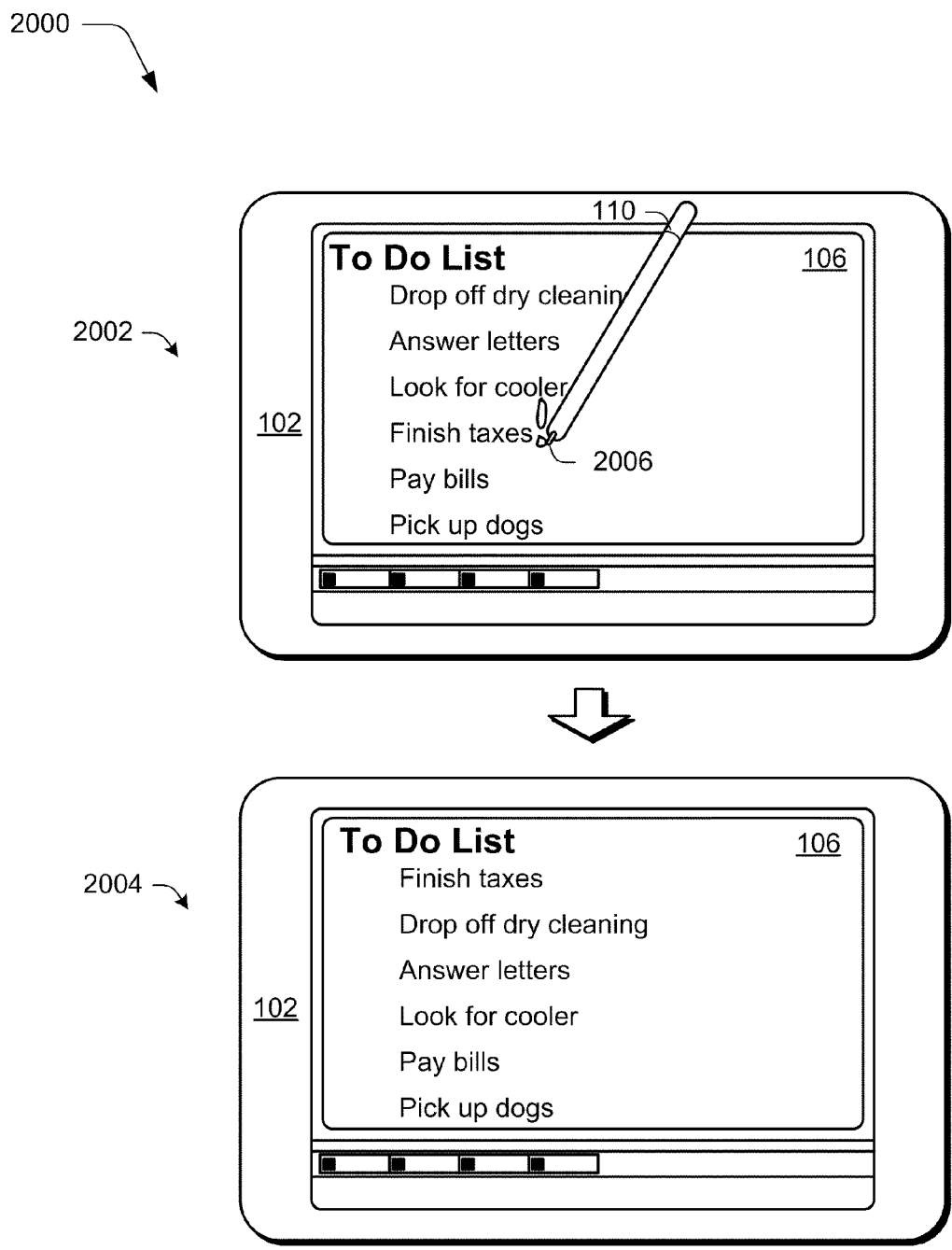
FIG. 20 is an illustration of an example implementation in which stages of a prioritize gesture of FIG. 1 are shown as being input through interaction with the computing device.

FIG. 20 is an illustration of an example implementation 1800 in which stages of the prioritize gesture 130 of FIG. 1 are shown as being input through interaction with the computing device 102. The prioritize gesture 130 is illustrated in FIG. 20 using first and second stages 2002, 2004. At the first stage 2002, a user interface is displayed by a display device 106 of the computing device 102. In this example, the user interface displays a "To Do List" and a number of items that the user has marked down to perform An exclamation point 2006 is illustrated as being drawn as a freeform line using the stylus 110, but may also be performed in a variety of other ways, such as through a touch input using a finger of the user's hand 108, captured via a camera in a natural user interface (NUI), and so on. In the illustrated example, the exclamation point 2006 is drawn next to an item "Finish Taxes" in the list.

Responsive to recognition of the exclamation point 2006 and a determination that the exclamation point 2006 is associated with an item displayed in the user interface (e.g., the "Finish Taxes" item), the gesture module 112 may identify the prioritize gesture 130. The identification of the prioritize gesture 130 may then be utilized to prioritize the item associated with the gesture, which in this instance is to display the item at a top of the list as shown in the second stage 2004.

In the illustrated implementation, "temporary ink" functionality is employed to remove the exclamation point 2006 upon identification of the gesture, although other implementations are also contemplated. For example, the exclamation point may be converted to a font that matches the font of the item (e.g., "Finish Taxes!") and remain with the item to indicate that the item has been prioritized. Additionally, subsequent items may also be prioritized in a similar manner such that a group of prioritized items may be displayed at a "top" of the list. Further, additional exclamation marks may be used to indicate levels of priority, e.g., "!," "!!," "!!!," and so on. These levels may then be used to group the prioritized items for display. A variety of other examples are also contemplated, further discussion of which may be found in relation to the following procedure.

FIG. 21 is a flow diagram that depicts a procedure 2100 in an example implementation of the prioritize gesture 130 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as an exclamation point drawn as a freeform line in association with an item displayed in a user interface of a display device of a computing device (block 2102). The freeform line, for instance, may be drawn using a stylus 110, a finger of the user's hand 108, and so on. Additionally, the freeform line may be drawn next to and/or "over" the item to indicate that the exclamation point is associated with the item and not another item.

A prioritize gesture is identified by the computing device from the recognized input, the prioritize gesture effective to prioritize the item (block 2104). For example, the item may be prioritized to be positioned first on a list (block 2106). In another example, the item may be flagged (block 2108), e.g., as important. A variety of other examples are also contemplated in which the prioritize gesture 130 is used to assign priority to one or more of a plurality of items.

Application Tray Gesture

Figure 22:
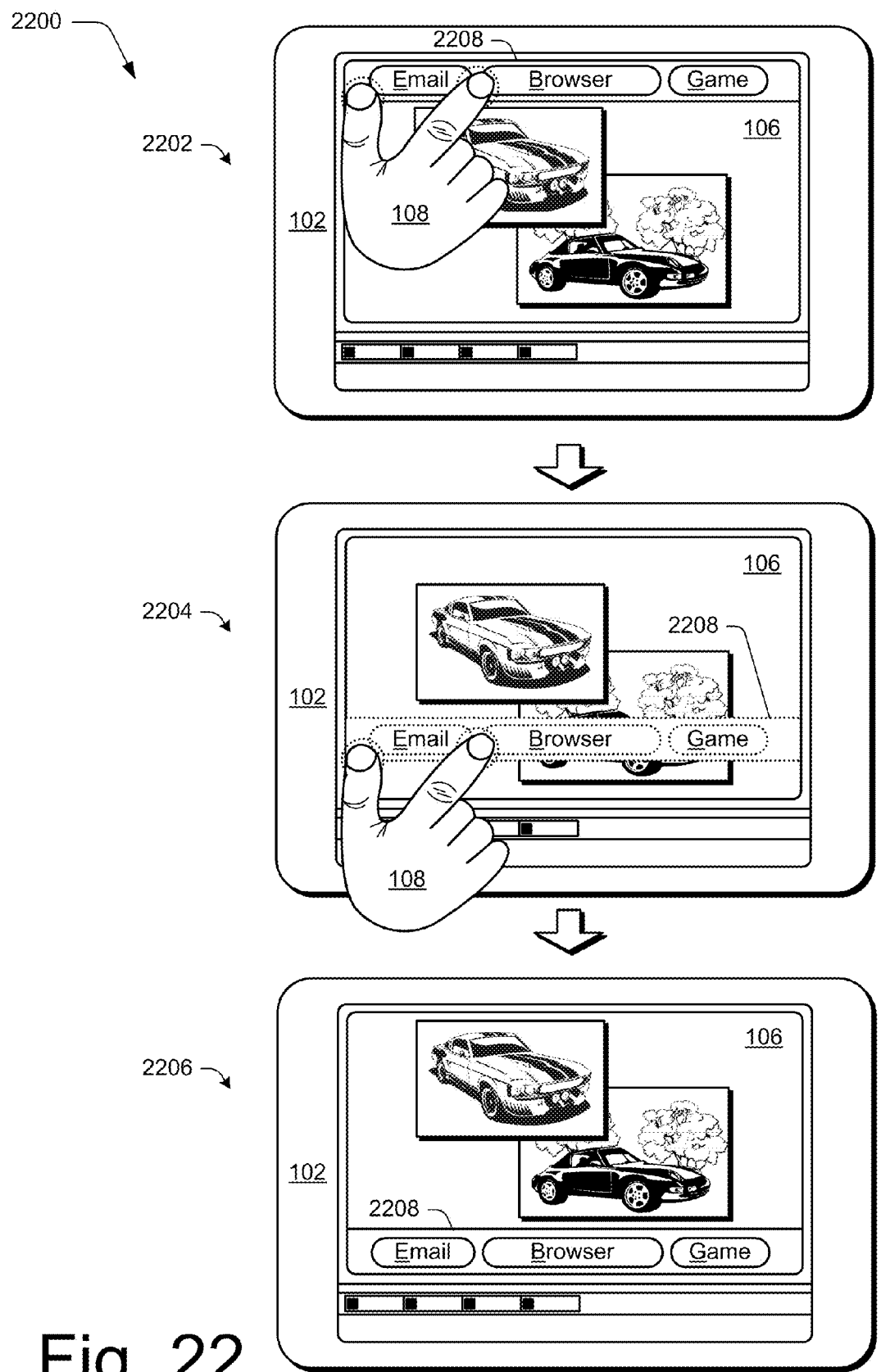
FIG. 22 is an illustration of an example implementation in which stages of an application tray gesture of FIG. 1 are shown as being input through interaction with the computing device.

FIG. 22 is an illustration of an example implementation 2200 in which stages of the application tray gesture 132 of FIG. 1 are shown as being input through interaction with the computing device 102. The application tray gesture 132 is illustrated in FIG. 22 using first, second, and third stages 2202, 2204, 2206. At the first stage 2202, an application tray 2208 is illustrated as being displayed near an edge of the display device 106. The application tray 2208 is also illustrated as including representations of applications that are currently being executed on the computing device, examples of which include "Email," "Browser," and "Game."

Selection of the representations may cause the user interface to navigate to the corresponding application, e.g., by tapping the representations using a finger of the user's hand 108, the stylus 110, and so on. The application tray 2208 may also include a variety of other functionality, such as representations of applications that are selectable to initiate execution of the represented application (e.g., icons), access to a "start" menu to navigate to folders and/or a control panel of the computing device 102, time and date indications, include auto-hide functionality, and so on.

The user's hand 108 is illustrated in the first stage as selecting the application tray 2208, which in this example is performed using two points of contact via touch inputs. Feedback regarding detection of the inputs may be displayed by the computing device 102, which in this example is shown using dashed circles around the points of contact of the fingers of the user's hand 108. Thus, in this example the two points of contact may be used to differentiate from a single point of contact, such as one that would be used to navigate to the represented applications (e.g., email). Other examples are also contemplated, such as to select the application tray 2208 using a single point of contact via a single finger of the user's hand 108, the stylus 110, and so on.

At the second stage 2204, the user's hand 108 is subsequently moved away from the edge of the display device 106 shown in the first stage 2302. Consequently, the gesture module 112 may recognize the application tray gesture 132 to move the application tray 2208 for display near another edge of the display device 106. In this example, the display of the application tray 2208 follows the subsequent movement of the user's hand 108. Further, the application tray 2208 may be displayed to indicate that it is being moved, such as make the application tray 2208 at least partially transparent which is illustrated in the second stage 2304 through the use of phantom lines.

At the third stage 2206, a result of releasing the contact with the application tray 2208 is shown such that the application tray 2208 is moved for subsequent display at another edge of the display device 106. For example, the fingers of the user's hand 108 may move near the edge of the display device 106 and then be pulled away from the display device 106. The gesture module 112 may interpret this part of the application tray gesture 132 as selecting an edge of the display device 106 that is nearest to the fingers of the user's hand 108 for the display of the application tray 2208.

Thus, in this example the application tray 2208 may be moved between edges of the display device 106 in the user interface without navigating through menus. Additionally, in this example the user interface is shifted to maintain visibility of underlying items, e.g., the images are moved "upward" in the illustrated example. Further discussion of the application tray gesture 132 may be found in relation to the following procedure.

Figure 23:
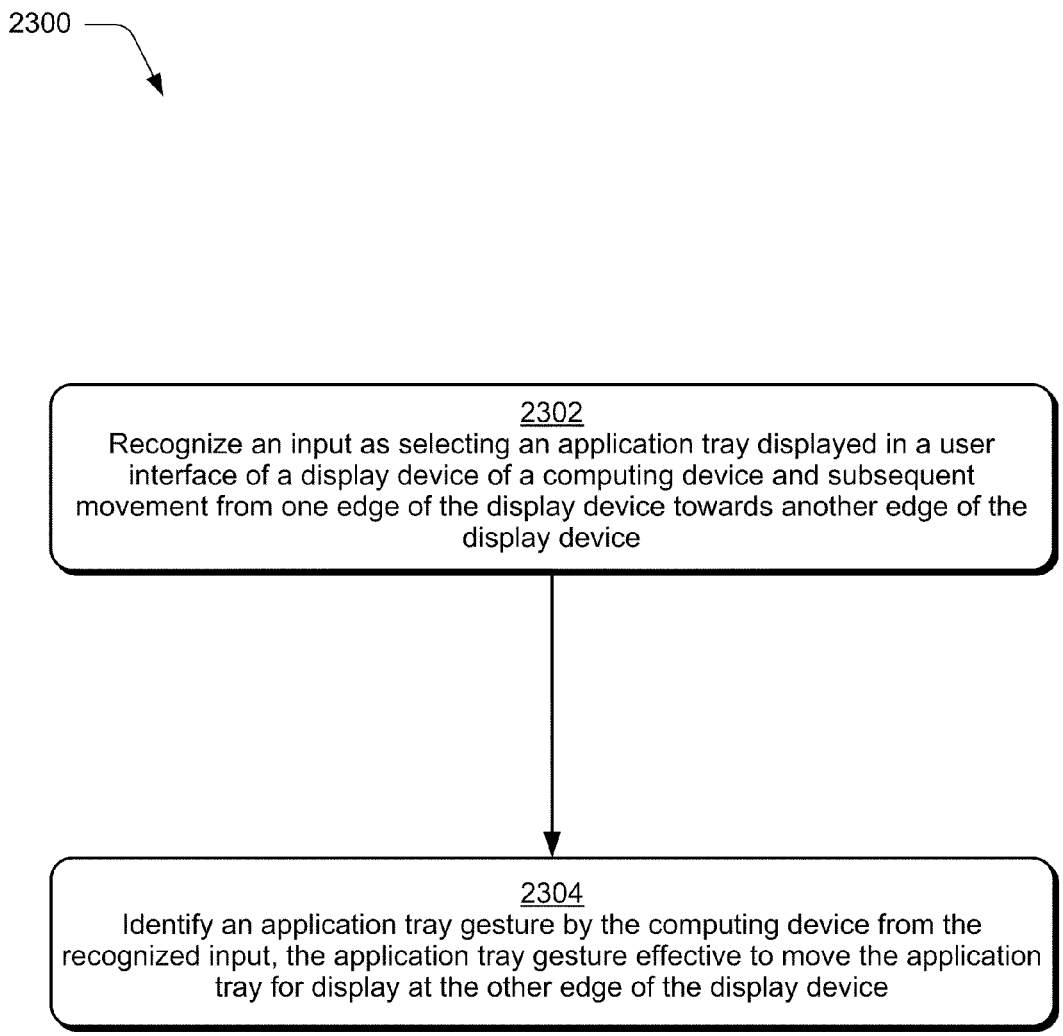
FIG. 23 is a flow diagram that depicts a procedure in an example implementation of the application tray gesture of FIG. 1 in accordance with one or more embodiments.

FIG. 23 is a flow diagram that depicts a procedure 2300 in an example implementation of the application tray gesture 132 of FIG. 1 in accordance with one or more embodiments. Aspects of the procedure may be implemented in hardware, firmware, software, or a combination thereof. The procedure is shown as a set of blocks in this example that specify operations performed by one or more devices and are not necessarily limited to the orders shown for performing the operations by the respective blocks.

An input is recognized as selecting an application tray displayed in a user interface of a display device of a computing device and subsequent movement from one edge of the display device towards another edge of the display device (block 2302). For example, the input may involve selection of the application tray 2208 using the stylus 110, one or more fingers of the user's hand 108, an input in a NUI, and so on. As shown in FIG. 22, for instance, two points of contact are used to select the application tray 2208 in the first stage 2202 and subsequent movement of the two points is used to indicate where the application tray 2208 is to be moved for display.

An application tray gesture is identified by the computing device from the recognized input, the application tray gesture effective to move the application tray for display at the other edge of the display device (block 2304). Continuing with the previous example, the gesture module 112 may recognize selection and subsequent movement of the inputs. The gesture module 112 may also recognize completion of the application tray gesture 132, such as to "release" the application tray by moving a source of the input away from the display device 106. Thus, in this example the application tray may be moved through utilization of the application tray gesture 132 without navigating through one or more menus. A variety of other examples are also contemplated without departing from the spirit and scope thereof.

Example Device

Figure 24:
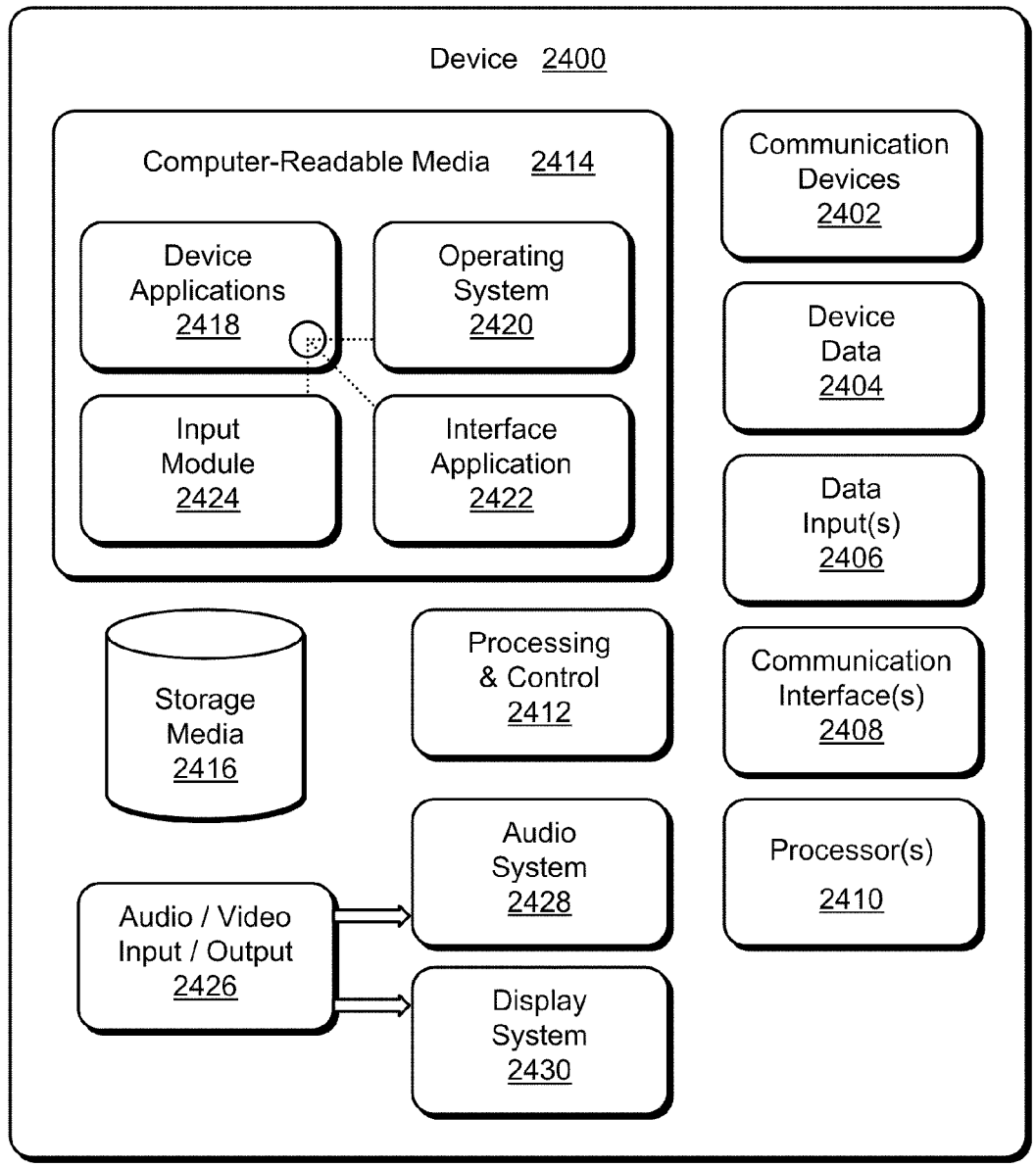
FIG. 24 illustrates various components of an example device that can be implemented as any type of portable and/or computer device as described with reference to FIGS. 1-23 to implement embodiments of the gesture techniques described herein.

FIG. 24 illustrates various components of an example device 2400 that can be implemented as any type of portable and/or computer device as described with reference to FIGS. 1 and 2 to implement embodiments of the gesture techniques described herein. Device 2400 includes communication devices 2402 that enable wired and/or wireless communication of device data 2404 (e.g., received data, data that is being received, data scheduled for broadcast, data packets of the data, etc.). The device data 2404 or other device content can include configuration settings of the device, media content stored on the device, and/or information associated with a user of the device. Media content stored on device 2400 can include any type of audio, video, and/or image data. Device 2400 includes one or more data inputs 2406 via which any type of data, media content, and/or inputs can be received, such as user-selectable inputs, messages, music, television media content, recorded video content, and any other type of audio, video, and/or image data received from any content and/or data source.

Device 2400 also includes communication interfaces 2408 that can be implemented as any one or more o\f a serial and/or parallel interface, a wireless interface, any type of network interface, a modem, and as any other type of communication interface. The communication interfaces 2408 provide a connection and/or communication links between device 2400 and a communication network by which other electronic, computing, and communication devices communicate data with device 2400.

Device 2400 includes one or more processors 2410 (e.g., any of microprocessors, controllers, and the like) which process various computer-executable instructions to control the operation of device 2400 and to implement embodiments of a touch pull-in gesture. Alternatively or in addition, device 2400 can be implemented with any one or combination of hardware, firmware, or fixed logic circuitry that is implemented in connection with processing and control circuits which are generally identified at 2412. Although not shown, device 2400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2400 also includes computer-readable media 2414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2400 can also include a mass storage media device 2416.

Computer-readable media 2414 provides data storage mechanisms to store the device data 2404, as well as various device applications 2418 and any other types of information and/or data related to operational aspects of device 2400. For example, an operating system 2420 can be maintained as a computer application with the computer-readable media 2414 and executed on processors 2410. The device applications 2418 can include a device manager (e.g., a control application, software application, signal processing and control module, code that is native to a particular device, a hardware abstraction layer for a particular device, etc.). The device applications 2418 also include any system components or modules to implement embodiments of the gesture techniques described herein. In this example, the device applications 2418 include an interface application 2422 and an input module 2424 (which may be the same or different as input module 114) that are shown as software modules and/or computer applications. The input module 2424 is representative of software that is used to provide an interface with a device configured to capture inputs, such as a touchscreen, track pad, camera, and so on. Alternatively or in addition, the interface application 2422 and the input module 2424 can be implemented as hardware, software, firmware, or any combination thereof. Additionally, the input module 2424 may be configured to support multiple input devices, such as separate devices to capture touch and stylus inputs, respectively. For example, the device may be configured to include dual display devices, in which one of the display device is configured to capture touch inputs while the other stylus inputs.

Device 2400 also includes an audio and/or video input-output system 2426 that provides audio data to an audio system 2428 and/or provides video data to a display system 2430. The audio system 2428 and/or the display system 2430 can include any devices that process, display, and/or otherwise render audio, video, and image data. Video signals and audio signals can be communicated from device 2400 to an audio device and/or to a display device via an RF (radio frequency) link, S-video link, composite video link, component video link, DVI (digital video interface), analog audio connection, or other similar communication link. In an embodiment, the audio system 2428 and/or the display system 2430 are implemented as external components to device 2400. Alternatively, the audio system 2428 and/or the display system 2430 are implemented as integrated components of example device 2400.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing an input as a freeform line drawn in association with a list displayed in a user interface by a display device of a computing device; and
   identifying a jump gesture from the recognized input, the jump gesture effective to use the recognized freeform line of the input as a basis to give focus to at least one item in the list, relative to a plurality of other items in the list, that corresponds to the input.

2. A method as described in claim 1, wherein the freeform line corresponds to at least one character and the at least one item includes the at least one character.

3. A method as described in claim 2, wherein the freeform line is drawn using a stylus.

4. A method as described in claim 1, further comprising performing the jump in real time by the computing device as the input is recognized and identified by the computing device.

5. A method as described in claim 1, wherein the input includes a plurality of characters and the jump is performed as each of the characters are received.

6. A method as described in claim 1, wherein the jump to the at least one item in the list that corresponds to the input includes display of a portion of the list that includes the at least one item.

7. A method as described in claim 6, wherein the portion of the list includes at least one other said item that does not correspond to the input.

8. A method as described in claim 1, wherein the user interface includes a plurality of said lists and the identifying includes determining which of the plurality of said lists corresponds to the input.

9. A method comprising:
recognizing an input as a checkmark drawn as a freeform line in association with an item displayed in a user interface by a display device of a computing device;
identifying a checkmark gesture from the recognized input, the checkmark gesture effective to select the item; and
responsive to the selecting, initiating the output of a menu associated with the selected item.

10. A method as described in claim 9, wherein the item is included in a list of items.

11. A method as described in claim 9, wherein the input is drawn using a stylus.

12. A method as described in claim 9, wherein the menu comprises actions associated with the selected item.

13. A method as described in claim 12, wherein selection of one of the actions includes initiation of the selected action associated with the selected item.

14. A method as described in claim 9, wherein the user interface includes a plurality of said items and the identifying includes determining which of the plurality of said items corresponds to the input.

15. A method comprising:
recognizing an input as a strikethrough drawn as a freeform line in association with an item displayed in a list of a plurality of items in a user interface by a display device of a computing device;
identifying a strikethrough gesture from the recognized input, the strikethrough gesture effective to give focus to the display of the item, relative to a plurality of other items in the list, to indicate that the item is to be deleted; and
outputting a verification that includes a portion that is selectable to verify that the item is to be deleted and delete the item responsive to selection of the verification.

16. A method as described in claim 15, wherein the item is included in a list of items.

17. A method as described in claim 15, wherein the input is drawn using a stylus.

18. A method as described in claim 15, wherein the user interface includes a plurality of said items and the identifying includes determining which of the plurality of said items corresponds to the input.

19. A method as described in claim 15, further comprising responsive to the identification of the strikethrough, removing the strikethrough displayed in the user interface.

20. A method of claim 15, wherein the verification further includes a portion that is selectable to cancel the deletion of the item.

21. A computing device comprising:
one or more processors;
one or more computer-readable media storing instructions that, when executed by the one or more processors, cause the computing device to perform operations including:
recognizing an input as a freeform line drawn in association with a list displayed in a user interface by a display device of the computing device; and
identifying a jump gesture from the recognized input, the jump gesture effective to use the recognized freeform line of the input as a basis to give focus to at least one item in the list, relative to a plurality of other items in the list, that corresponds to the input.

22. A computing device as described in claim 21, wherein the freeform line corresponds to at least one character and the at least one item includes the at least one character.

23. A computing device as described in claim 22, wherein the freeform line is drawn using a stylus.

24. A computing device as described in claim 21, further comprising performing the jump in real time by the computing device as the input is recognized and identified by the computing device.

25. A computing device as described in claim 21, wherein the input includes a plurality of characters and the jump is performed as each of the characters are received.

26. A computing device as described in claim 21, wherein the jump to the at least one item in the list that corresponds to the input includes display of a portion of the list that includes the at least one item.

27. A computing device as described in claim 26, wherein the portion of the list includes at least one other said item that does not correspond to the input.

28. A computing device as described in claim 21, wherein the user interface includes a plurality of said lists and the identifying includes determining which of the plurality of said lists corresponds to the input.

29. A computing device comprising:
one or more processors;
one or more computer-readable media storing instructions that, when executed by the one or more processors, cause the computing device to perform operations including:
recognizing an input as a checkmark drawn as a freeform line in association with an item displayed in a user interface by a display device of the computing device;
identifying a checkmark gesture from the recognized input, the checkmark gesture effective to select the item; and
responsive to the selecting, initiating the output of a menu associated with the selected item.

30. A computing device as described in claim 29, wherein the item is included in a list of items.

31. A computing device as described in claim 29, wherein the input is drawn using a stylus.

32. A computing device as described in claim 29, wherein the menu comprises actions associated with the selected item.

33. A computing device as described in claim 32, wherein selection of one of the actions includes initiation of the selected action associated with the selected item.

34. A computing device as described in claim 29, wherein the user interface includes a plurality of said items and the identifying includes determining which of the plurality of said items corresponds to the input.

35. A computing device comprising:
one or more processors;
one or more computer-readable media storing instructions that, when executed by the one or more processors, cause the computing device to perform operations including:
recognizing an input as a strikethrough drawn as a freeform line in association with an item displayed in a list of a plurality of items in a user interface by a display device of the computing device;
identifying a strikethrough gesture from the recognized input, the strikethrough gesture effective to give focus to the display of the item, relative to a plurality of other items in the list, to indicate that the item is to be deleted; and outputting a verification that includes a portion that is selectable to verify that the item is to be deleted and delete the item responsive to selection of the verification.

36. A computing device as described in claim 35, wherein the item is included in a list of items.

37. A computing device as described in claim 35, wherein the input is drawn using a stylus.

38. A computing device as described in claim 35, wherein the user interface includes a plurality of said items and the identifying includes determining which of the plurality of said items corresponds to the input.

39. A computing device as described in claim 35, further comprising responsive to the identification of the strikethrough, removing the strikethrough displayed in the user interface.

40. A computing device of claim 35, wherein the verification further includes a portion that is selectable to cancel the deletion of the item.

41. One or more computer-readable memories storing instructions that, when executed by a computing device, cause the computing device to perform operations comprising:

recognizing an input as a freeform line drawn in association with a list displayed in a user interface by a display device of the computing device; and identifying a jump gesture from the recognized input, the jump gesture effective to use the recognized freeform line of the input as a basis to give focus to at least one item in the list, relative to a plurality of other items in the list, that corresponds to the input.

42. One or more computer-readable memories as described in claim 41, wherein the freeform line corresponds to at least one character and the at least one item includes the at least one character.

43. One or more computer-readable memories as described in claim 42, wherein the freeform line is drawn using a stylus.

44. One or more computer-readable memories as described in claim 41, further comprising performing the jump in real time by the computing device as the input is recognized and identified by the computing device.

45. One or more computer-readable memories as described in claim 41, wherein the input includes a plurality of characters and the jump is performed as each of the characters are received.

46. One or more computer-readable memories as described in claim 41, wherein the jump to the at least one item in the list that corresponds to the input includes display of a portion of the list that includes the at least one item.

47. One or more computer-readable memories as described in claim 46, wherein the portion of the list includes at least one other said item that does not correspond to the input.

48. One or more computer-readable memories as described in claim 41, wherein the user interface includes a plurality of said lists and the identifying includes determining which of the plurality of said lists corresponds to the input.

49. One or more computer-readable memories storing instructions that, when executed by a computing device, cause the computing device to perform operations comprising:

recognizing an input as a checkmark drawn as a freeform line in association with an item displayed in a user interface by a display device of the computing device;

identifying a checkmark gesture from the recognized input, the checkmark gesture effective to select the item; and responsive to the selecting, initiating the output of a menu associated with the selected item.

50. One or more computer-readable memories as described in claim 49, wherein the item is included in a list of items.

51. One or more computer-readable memories as described in claim 49, wherein the input is drawn using a stylus.

52. One or more computer-readable memories as described in claim 49, wherein the menu comprises actions associated with the selected item.

53. One or more computer-readable memories as described in claim 52, wherein selection of one of the actions includes initiation of the selected action associated with the selected item.

54. One or more computer-readable memories as described in claim 49, wherein the user interface includes a plurality of said items and the identifying includes determining which of the plurality of said items corresponds to the input.

55. One or more computer-readable memories storing instructions that, when executed by a computing device, cause the computing device to perform operations comprising:

recognizing an input as a strikethrough drawn as a freeform line in association with an item displayed in a list of a plurality of items in a user interface by a display device of the computing device;

identifying a strikethrough gesture from the recognized input, the strikethrough gesture effective to give focus to the display of the item, relative to a plurality of other items in the list, to indicate that the item is to be deleted; and outputting a verification that includes a portion that is selectable to verify that the item is to be deleted and delete the item responsive to selection of the verification.

56. One or more computer-readable memories as described in claim 55, wherein the item is included in a list of items.

57. One or more computer-readable memories as described in claim 55, wherein the input is drawn using a stylus.

58. One or more computer-readable memories as described in claim 55, wherein the user interface includes a plurality of said items and the identifying includes determining which of the plurality of said items corresponds to the input.

59. One or more computer-readable memories as described in claim 55, further comprising responsive to the identification of the strikethrough, removing the strikethrough displayed in the user interface.

60. One or more computer-readable memories of claim 55, wherein the verification further includes a portion that is selectable to cancel the deletion of the item.

* * * * *

UNITED STATES PATENT AND TRADEMARK OFFICE
CERTIFICATE OF CORRECTION

| | | |
|---|---|---|
| PATENT NO. | : 8,635,555 B2 | Page 1 of 1 |
| APPLICATION NO. | : 12/796476 | |
| DATED | : January 21, 2014 | |
| INVENTOR(S) | : Harris et al. | |

It is certified that error appears in the above-identified patent and that said Letters Patent is hereby corrected as shown below:

On the title page item [73], delete "Adobe Systems Incorporated, San Jose, CA (US)" and insert --Microsoft Corporation, Redmond, WA (US)--, therefor.

Signed and Sealed this
Twenty-second Day of April, 2014

Michelle K. Lee
*Deputy Director of the United States Patent and Trademark Office*